United States Patent
Wakamatsu

(10) Patent No.: US 7,903,591 B2
(45) Date of Patent: Mar. 8, 2011

(54) INFORMATION PROCESSING SYSTEM, INFORMATION PROCESSOR, INFORMATION PROCESSING METHOD, RECEIVER, RECEIVING METHOD, AND PROGRAM

(75) Inventor: Masataka Wakamatsu, Kanagawa (JP)

(73) Assignee: Sony Corporation, Tokyo (JP)

(*) Notice: Subject to any disclaimer, the term of this patent is extended or adjusted under 35 U.S.C. 154(b) by 1160 days.

(21) Appl. No.: 10/853,315

(22) Filed: May 26, 2004

(65) Prior Publication Data

US 2005/0008130 A1   Jan. 13, 2005

(30) Foreign Application Priority Data

May 30, 2003   (JP) .................. 2003-153928

(51) Int. Cl.
*H04B 1/44* (2006.01)
(52) U.S. Cl. ......... 370/282; 370/338; 370/901; 725/143; 455/456.1; 455/432.1
(58) Field of Classification Search .................. 370/282, 370/338, 901; 725/143; 707/104.1; 455/456.1, 455/432.1
See application file for complete search history.

(56) References Cited

U.S. PATENT DOCUMENTS

| | | | |
|---|---|---|---|
| 6,363,412 B1 * | 3/2002 | Niwa et al. ..................... 709/203 |
| 6,744,753 B2 * | 6/2004 | Heinonen et al. ............. 370/338 |
| 6,965,770 B2 * | 11/2005 | Walsh et al. ................ 455/426.1 |
| 2002/0023092 A1 * | 2/2002 | Tamura et al. .............. 707/104.1 |
| 2002/0039148 A1 * | 4/2002 | Yamamoto .................... 348/469 |
| 2002/0087642 A1 * | 7/2002 | Wei et al. ....................... 709/206 |
| 2002/0129371 A1 * | 9/2002 | Emura et al. ..................... 725/61 |
| 2003/0221011 A1 * | 11/2003 | Shitano ......................... 709/229 |
| 2004/0057408 A1 * | 3/2004 | Gray ............................. 370/338 |

FOREIGN PATENT DOCUMENTS

| | | |
|---|---|---|
| JP | 09-284567 | 10/1997 |
| JP | 11-168498 | 6/1999 |
| JP | 2000-83061 | 3/2000 |
| JP | 2000-235529 | 8/2000 |
| JP | 2001-5751 | 1/2001 |
| JP | 2001-217860 | 8/2001 |
| JP | 2001-227959 | 8/2001 |
| JP | 2001-282641 | 10/2001 |
| JP | 2001-356996 | 12/2001 |
| JP | 2002-183057 | 6/2002 |
| JP | 2002-209276 | 7/2002 |
| JP | 2003-153241 | 5/2003 |

* cited by examiner

*Primary Examiner* — Huy D Vu
*Assistant Examiner* — Kibrom T Hailu
(74) *Attorney, Agent, or Firm* — Oblon, Spivak, McClelland, Maier & Neustadt, L.L.P.

(57) ABSTRACT

The present invention provides an information processing system enabled to transmit and receive video mails at a higher transfer rate and at reduced cost. In this system, a file server sends a low capacity notification mail, which notifies the presence of a video mail sent from a portable terminal, to another portable terminal. This portable terminal accesses the file server in response to the notification mail, and downloads the video mail therefrom via a WLAN network that is a broadband communication line.

21 Claims, 11 Drawing Sheets

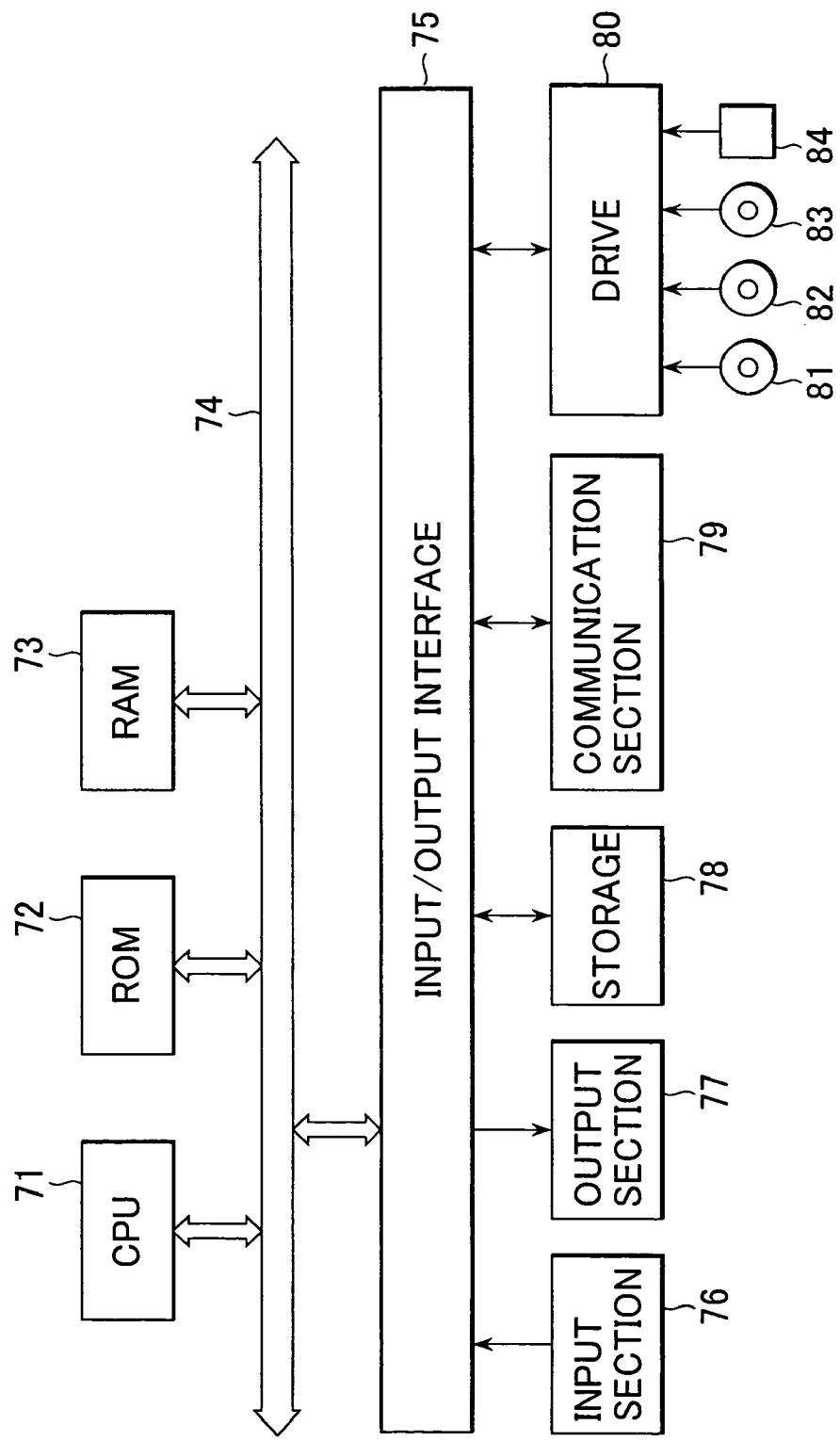

INFORMATION PROCESSING SYSTEM, INFORMATION PROCESSOR, INFORMATION PROCESSING METHOD, RECEIVER, RECEIVING METHOD, AND PROGRAM

CROSS REFERENCE TO RELATED APPLICATIONS

The present document is based on Japanese Priority Application JP2003-153928 filed in the Japanese Patent Office on May 30, 2003, the contents in which being incorporated herein by reference to the extent permitted by law.

BACKGROUND OF THE INVENTION

1. Field of the Invention

The present invention generally relates to an information processing system, an information processor, an information processing method, a receiver, a receiving method, and a program. More particularly, the present invention relates to an information processing system, an information processor, an information processing method, a receiver, a receiving method, and a program, which are enabled to provide a high-quality video mail at low cost by combining features of a portable telephone and a Wireless LAN (Local Area Network) (hereunder sometimes referred to as "WLAN"), for example, broadness of a service area of the portable telephone and a high transfer rate of the WLAN.

2. Description of the Related Art

There is information processor available in the related art adapted to notify a user of update of an email through a narrowband channel used by a portable telephone and to download a specific file of an email or the like through a wideband channel implementing a high transfer rate (see Japanese Patent Application Publication Laid-Open No. 2000-83061 Official Gazette). According to this information processor of the related art, users can retrieve the latest updates thereof, when needed, without incurring uncontrollable costs and increasing unnecessary network traffic on a transmission path, such as a telephone line. By the way, techniques described in such document are intended to reduce the number of accesses to Web pages, which are made by using a kind of an email magazine, and do not provide means for achieving communication among individuals.

There has been another information processor in the related art, controlled so that information representing mails received by or transmitted from a mail server is stored in storage means and that the mails sent from or to a user, which are stored in the storage means, can be displayed in response to an access from another user according to an access right preliminarily given to this user (see Japanese Patent Application Publication Laid-Open No. 2002-44124 Official Gazette). According to this information processor, a mail can be shared among a plurality of terminals.

Meanwhile, in recent years, a portable telephone system has become widespread. Service is provided in a wide service area. Also, portable telephones have enabled not only voice calls but exchange of emails, photo emails (in other words, emails with still images), and motion picture mails, and communication with a television telephone.

SUMMARY OF THE INVENTION

However, the transmission band of the portable telephone ranges from 100 kbps (kilobits per second) to 300 kbps at the maximum. Thus, the portable telephones have been able to treat only low resolution images. In a case that an image is viewed on a small screen of the portable telephone, even when the image has low resolution, picture quality of the image is less significant. However, in a case that a motion picture mail is sent by a user to a home server installed at his home from a place where he has gone, and that a video attached to the video mail is viewed on a large screen television receiver placed at a living room of his home, low image quality of the video is sometimes conspicuous.

Thus, there has been developed a method of coding a video at a certain bit rate. When a video is coded at a bit rate of, for example, 4 Mbps, an amount of information to be transmitted per minute is 30 Mbytes. Needless to say, in a case where this amount of information is downloaded at the transfer rates of the portable telephones having been put in practical use, and even in a case where this amount of information is downloaded at a transfer rate expected to be achieved within the coming several years, time and cost required to download this amount of information are large.

On the other hand, public wireless services using WLAN, which have recently been launched and are expected to provide a transfer rate that is nearly two orders of magnitude higher than the transfer rate of the portable telephone. However, service areas (hereunder sometimes referred to as "cells") covered by the public wireless services are limited. Thus, when no user is present in the cells, even the presence of a motion picture mail cannot be recognized by the public wireless services.

As described above, the service area of the portable telephone is wide, whereas the transmission band thereof is narrow. Conversely, the transmission band of the public wireless service using WLAN is wide, whereas the service areas thereof are limited. Therefore, the portable telephone networks have a problem of the cost of transmission and reception of video mails having picture of high quality, while the public wireless services have a problem in that there are a large number of areas in which neither motion picture mails nor emails can be transmitted and received.

The invention has been conceived in view of these circumstances, to enable low-cost processing of mails of high (picture) quality motion picture and the like by organically combining, for example, the broadness of service areas of the portable telephone or the like with the high transfer rate of a WLAN and the like.

According to an aspect of the present invention, there is provided an information processing system (hereunder referred to as a first information processing system of the present invention) having an information processor for receiving data transmitted from a transmitter and for processing the data, and a receiver for receiving data from the information processor. This information processor comprises data receptacle (associated with, for example, an authenticator 21 described in an embodiment of the present invention, which will be described later by referring to FIG. 3) for receiving data that includes large volume data, which is data of large volume, and also includes a destination, notification information transmitter (associated with, for example, a transmitter 28 shown in FIG. 3) for transmitting notification information, which notifies the presence of the large volume data, to the receiver, which is a destination of the data, through a narrowband communication circuit, and large volume data transmitter (associated with, for example, the transmitter 28 shown in FIG. 3) for transmitting the large volume data in response to a request, which is sent from the receiver, through a broadband communication circuit to the receiver having sent the request. This receiver includes notification information receptacle (associated with, for example, a receiver 61 shown in FIG. 9) for receiving the notification information, which is sent thereto, through the narrowband communication circuit, request means (associated with, for example, a video mail request command generator 63 shown in FIG. 9) for requesting the large volume data of the information processor according to the notification information, and large volume data receptacle (associated with, for example, the receiver 61 shown in FIG. 9) for receiving the large volume data, which is sent from the information processor in response to the request for the large volume data, through the broadband communication circuit.

By the way, descriptions within parentheses, which have been described just above and are described below and indicate the corresponding relation between features of the present invention and examples of preferred embodiments (to be described later), are intended to confirm that the preferred embodiments (to be described later) have components respectively embodying features of the present invention. Therefore, even when a practical component is described in the description of the preferred embodiments (to be described later) and not described in the descriptions within parentheses herein as being associated with one of the features of the present invention, this does not mean that this component in the example of embodiment is not associated with any features of the present invention. Conversely, even when a component of an example of preferred embodiment (to be described later) is described in the descriptions within parentheses therein as being associated with one of the features of the present invention, this does not means that this particular component is not associated with any other feature of the present invention.

Also, the descriptions within parentheses do not mean that all the present invention embodied by the preferred embodiments (to be described later) is described in the appended claims. In other words, the descriptions within parentheses do not deny the presence of the invention as being embodied by the preferred embodiments and not described in the appended claims, in other words, the presence of the present invention described in a divisional application in the future or the present invention to be added by an amendment in the future.

According to another aspect of the present invention, there is provided an information processing method (hereunder referred to as a first information processing method of the present invention) for use in an information processing system having an information processor for receiving data transmitted from a transmitter and for processing the data, and a receiver for receiving data from the information processor. The first information processing method of the present invention includes a data receiving step (associated with, for example, processing performed by the authenticator 21 shown in FIG. 3) of receiving data including large volume data, which is data of large volume, and also including a destination, in the information processor, a notification information transmitting step (associated with, for example, a processing step S18 of a program illustrated in FIG. 6) of transmitting notification information, which notifies the presence of the large volume data, to the receiver, which is a destination of the data, through a narrowband communication circuit by the information processor, a notification receiving step (associated with, for example, a processing step S51 of a program illustrated in FIG. 10) of receiving the notification information, which is destined for the receiver, through a narrowband communication circuit by the receiver, a request step (associated with, for example, a processing step S53 of the program illustrated in FIG. 10) of requesting the large volume data of the information processor according to the notification information by the receiver, a large volume data transmitting step (associated with, for example, a processing step S37 of a program illustrated in FIG. 8) of transmitting the large volume data in response to a request, which is sent from the receiver, through a broadband communication circuit by the information processor to the receiver having made the request, and a large volume data receiving step (associated with, for example, a processing step S56 of the program illustrated in FIG. 10) of receiving the large volume data, which is sent from the information processor in response to the request for the large volume data, through the broadband communication circuit by the receiver.

According to another aspect of the present invention, there is provided a program (hereunder referred to as a first program of the present invention) for causing a computer to perform processing in an information processing system having an information processor for receiving data transmitted from a transmitter and for processing the data, and a receiver for receiving data from the information processor. The first program of the present invention includes a data receiving step (associated with, for example, processing performed by the authenticator 21 shown in FIG. 3) of receiving data including large volume data, which is data of large volume, and also including a destination, in the information processor, a notification information transmitting step (associated with, for example, a processing step S18 of a program illustrated in FIG. 6) of transmitting notification information, which notifies the presence of the large volume data, to the receiver, which is a destination of the data, through a narrowband communication circuit by the information processor, a notification information receiving step (associated with, for example, a processing step S51 of a program illustrated in FIG. 10) of receiving the notification information, which is destined for the receiver) through a narrowband communication circuit by the receiver, a request step (associated with, for example, a processing step S53 of the program illustrated in FIG. 10) of requesting the large volume data of the information processor according to the notification information by the receiver, a large volume data transmitting step (associated with, for example, a processing step S37 of a program illustrated in FIG. 8) of transmitting the large volume data in response to a request, which is sent from the receiver, through a broadband communication circuit by the information processor to the receiver having made, and a large volume data receiving step (associated with, for example, a processing step S56 of the program illustrated in FIG. 10) of receiving the large volume data, which is sent from the information processor in response to the request for the large volume data, through the broadband communication circuit by the receiver.

According to another aspect of the present invention, there is provided an information processor (hereunder referred to as a first information processor of the present invention) for receiving and processing data transmitted from a transmitter, which includes data receptacle (associated with, for example, the authenticator 21 shown in FIG. 3) for receiving data that is transmitted from the transmitter and includes large volume data, which is data of large volume, and also includes a destination, notification information transmitter (associated with, for example, the transmitter 28 shown in FIG. 3) for transmitting notification information, which notifies the presence of the large volume data, to the receiver, which is a destination of the data, through a narrowband communication circuit, and large volume data transmitter (associated with, for example, the transmitter 28 shown in FIG. 3) for transmitting the large volume data through a broadband communication circuit in response to a request from the receiver.

An embodiment of the first information processor of the present invention further includes an access key generator (associated with, for example, an access key generator 26 shown in FIG. 3) for generating an access key for accessing the large volume data. In this information processor, the large capacity transmitter transmits the large volume data associated with the access key transmitted from the receiver.

An embodiment of the first information processor of the present invention further includes format converter (associated with, for example, a format converter 24 shown in FIG. 3) for converting a format of the large volume data to a format associated with the receiver. In this information processor, the large volume data transmitter transmits the format-converted large volume data.

According to another aspect of the present invention, there is provided an information processing method (hereunder referred to as a second information processing method of the present invention) for receiving and processing data transmitted from a transmitter, which includes a data receiving step (associated with a processing step S14 of the program illustrated in FIG. 6) of receiving data that is transmitted from the transmitter and includes large volume data, which is data of large volume, and also includes a destination, a notification information transmitting step (associated with, for example, the processing step S18 of the program illustrated in FIG. 6) of transmitting notification information, which notifies the presence of the large volume data, to the receiver, which is a destination of the data, through a narrowband communication circuit, and a large volume data transmitting step (associated with, the processing step S37 of the program illustrated in FIG. 8) of transmitting the large volume data to the receiver, which has made a request, through a broadband communication circuit in response to the request therefrom.

According to another aspect of the present invention, there is provided a program (hereunder referred to as a second program of the present invention) for causing a computer to perform an information processing process of receiving and processing data transmitted from a transmitter, which includes a data receiving step (associated with a processing step S14 of the program illustrated in FIG. 6) of receiving data that is transmitted from the transmitter and includes large volume data, which is data of large volume, and also includes a destination, a notification information transmitting step (associated with, for example, the processing step S18 of the program illustrated in FIG. 6) of transmitting notification information, which notifies the presence of the large volume data, to the receiver, which is a destination of the data, through a narrowband communication circuit, and a large volume data transmitting step (associated with, the processing step S37 of the program illustrated in FIG. 8) of transmitting the large volume data to the receiver, which has made a request, through a broadband communication circuit in response to the request therefrom.

According to another aspect of the present invention, there is provided a receiver (hereunder referred to as a first receiver of the present invention) for receiving data from an information processor, which receives and processes data transmitted from a transmitter. The first receiver includes notification information receptacle (associated with, for example, the receiver 61 shown in FIG. 9) for receiving from the information processor notification information notifying presence of large volume data that is data of large volume, which is destined for the receiver and sent from the transmitter to the information processor, through a narrowband communication circuit, request means (associated with, for example, the video mail request generator 63 shown in FIG. 9) for requesting the large volume data of the information processor, and large volume data receptacle (associated with, for example, the receiver 61 shown in FIG. 9) for receiving the large volume data, which is transmitted from the information processor in response to the request therefor, through a broadband communication circuit.

According to still another aspect of the present invention, there is provided a receiving method (hereunder referred to as a first receiving method of the present invention) of receiving data from an information processor, which receives and processes data transmitted from a transmitter. The first receiving method includes a notification information receiving step (associated with, for example, the processing step S51 of the program shown in FIG. 10) of receiving from the information processor notification information notifying the presence of large volume data that is data of large volume, which is destined for the receiver and sent from the transmitter to the information processor, through a narrowband communication circuit, a request step (associated with, for example, the processing step S53 of the program shown in FIG. 10) of requesting the large volume data of the information processor, and a large volume data receiving step (associated with, for example, the processing step S56 of the program shown in FIG. 10) of receiving the large volume data, which is transmitted from the information processor in response to the request therefor, through a broadband communication circuit.

According to another aspect of the present invention, there is provided a program (hereunder referred to as a third program of the present invention) for causing a computer to perform a receiving process of receiving data from an information processor, which receives and processes data transmitted from a transmitter. The third program of the present invention includes a notification information receiving step (associated with, for example, the processing step S51 of the program shown in FIG. 10) of receiving from the information processor notification information notifying the presence of large volume data that is data of large volume, which is destined for the receiver and sent from the transmitter to the information processor, through a narrowband communication circuit, a request step (associated with, for example, the processing step S53 of the program shown in FIG. 10) of requesting the large volume data of the information processor, and a large volume data receiving step (associated with, for example, the processing step S56 of the program shown in FIG. 10) of receiving the large volume data, which is transmitted from the information processor in response to the request therefor, through a broadband communication circuit.

According to another aspect of the present invention, there is provided an information processing system (hereunder referred to as a second information processing system of the present invention) having an information processor for receiving data transmitted from a transmitter and for processing the data, and a receiver for receiving data from the information processor. The information processor includes data receptacle (associated with, for example, the authenticator 21 shown in FIG. 3) for receiving data that includes large volume data, which is data of large volume, and also includes a destination, notification information transmitter (associated with, for example, the transmitter 28 shown in FIG. 3) for transmitting notification information, which notifies the presence of the large volume data, to the receiver, which is a destination of the data, through a narrowband communication circuit, and large volume data transmitter (associated with, for example, the transmitter 28 shown in FIG. 3) for transmitting the large volume data in response to a request, which is sent from the receiver, through a broadband communication circuit to the receiver having sent the request. This receiver includes notification information receptacle (associated with, for example, the receiver 61 shown in FIG. 9) for receiving the notification information, which is sent thereto, through the narrowband communication circuit, request means (associated with, for example, the video mail request command generator 63 shown in FIG. 9) for requesting the large volume data of the information processor according to the notification information, and large volume data receptacle (associated with, for example, the receiver 61 shown in FIG. 9) for receiving the large volume data, which is sent from the information processor in response to there quest for the large volume data, through the broadband communication circuit. In the second information processing system of the present invention, at least one of the narrowband communication circuit and the broadband communication circuit is a wireless circuit.

According to another aspect of the present invention, there is provided an information processing method (hereunder referred to as a third information processing method of the present invention) for use in an information processing system having an information processor for receiving data transmitted from a transmitter and for processing the data, and a receiver for receiving data from the information processor. The third information processing method of the present invention includes a data receiving step (associated with, for example, the processing step S14 of the program shown in FIG. 6) of receiving data including large volume data, which is data of large volume, in the information processor, a notification information transmitting step (associated with, for example, the processing step S18 of the program illustrated in FIG. 6) of transmitting notification information, which notifies the presence of the large volume data, to the receiver through a narrowband communication circuit by the information processor, a notification information receiving step (associated with, for example, a processing step S51 of a program illustrated in FIG. 10) of receiving the notification information, which is destined for the receiver) through a narrowband communication circuit by the receiver, a request step (associated with, for example, the processing step S53 of the program illustrated in FIG. 10) of requesting the large volume data of the information processor according to the notification information by the receiver, a large volume data transmitting step (associated with, for example, a processing step S37 of a program illustrated in FIG. 8) of transmitting the large volume data in response to a request, which is sent from the receiver, through a broadband communication circuit by the information processor to the receiver having made the request, and a large volume data receiving step (associated with, for example, the processing step S56 of the program illustrated in FIG. 10) of receiving the large volume data, which is sent from the information processor in response to the request for the large volume data, through the broadband communication circuit by the receiver. According to the third information processing method of the present invention, at least one of the narrowband communication circuit and the broadband communication circuit is a wireless circuit.

According to another aspect of the present invention, there is provided a program (hereunder referred to as a fourth program of the present invention) for causing a computer to perform processing in an information processing system having an information processor for receiving data transmitted from a transmitter and for processing the data, and a receiver for receiving data from the information processor. The fourth program of the present invention includes a data receiving step (associated with, for example, the processing step S14 of the program shown in FIG. 6) of receiving data including large volume data, which is data of large volume, in the information processor, a notification information transmitting step (associated with, for example, the processing step S18 of the program illustrated in FIG. 6) of transmitting notification information, which notifies the presence of the large volume data, to the receiver through a narrowband communication circuit by the information processor, a notification information receiving step (associated with, for example, a processing step S51 of a program illustrated in FIG. 10) of receiving the notification information, which is destined for the receiver) through a narrowband communication circuit by the receiver, a request step (associated with, for example, the processing step S53 of the program illustrated in FIG. 10) of requesting the large volume data of the information processor according to the notification information by the receiver, a large volume data transmitting step (associated with, for example, a processing step S37 of a program illustrated in FIG. 8) of transmitting the large volume data in response to a request, which is sent from the receiver, through a broadband communication circuit by the information processor to the receiver having made the request, and a large volume data receiving step (associated with, for example, the processing step S56 of the program illustrated in FIG. 10) of receiving the large volume data, which is sent from the information processor in response to the request for the large volume data, through the broadband communication circuit by the receiver. According to the fourth program of the present invention, at least one of the narrowband communication circuit and the broadband communication circuit is a wireless circuit.

According to another aspect of the present invention, there is provided an information processor (hereunder referred to as a second information processor of the present invention) for receiving and processing data transmitted from a transmitter. The fourth information processor of the present invention includes data receptacle (associated with, for example, the authenticator 21 shown in FIG. 3) for receiving data that is transmitted from the transmitter and includes large volume data, which is data of large volume, notification information transmitter (associated with, for example, the transmitter 28 shown in FIG. 3) for transmitting notification information, which notifies the presence of the large volume data, to the receiver through a narrowband communication circuit, and large volume data transmitter (associated with, for example, the transmitter 28 shown in FIG. 3) for transmitting the large volume data to the receiver, which has made a request, through a broadband communication circuit in response to the request therefrom. In the second information processor of the present invention, at least one of the narrowband communication circuit and the broadband communication circuit is a wireless circuit.

An embodiment of the second information processor of the present invention further includes an access key generator (associated with the access key generator 26 show in FIG. 3) for generating an access key for accessing the large volume data. In this information processor of the present invention, the information transmitter adds the access key to the notification information and then transmits the notification information including the access key. The large volume data transmitter transmits large volume data associated with the access key transmitted from the receiver.

An embodiment of the second information processor of the present invention further includes format converter (associated with the format converter 24 shown in FIG. 3) for converting a format of the large volume data to a format associated with the receiver. In this information processor of the present invention, the large volume data transmitter transmits the format-converted large volume data.

According to another aspect of the present invention, there is provided an information processing method (hereunder referred to as a fourth information processing method of the present invention) for receiving and processing data transmitted from a transmitter. The fourth information processing method of the present invention includes a data receiving step (associated with the processing performed by the authenticator 21 shown in FIG. 3) of receiving data that is transmitted from the transmitter and includes large volume data, which is data of large volume, a notification information transmitting step (associated with, for example, the processing step S18 of the program illustrated in FIG. 6) of transmitting notification information, which notifies the presence of the large volume data, to the receiver through a narrowband communication circuit, and a large volume data transmitting step (associated with the processing step S37 of the program illustrated in FIG. 8) of transmitting the large volume data to the receiver, which has made a request, through a broadband communication circuit in response to the request therefrom. According to the fourth information processing method of the present invention, at least one of the narrowband communication circuit and the broadband communication circuit is a wireless circuit.

According to another aspect of the present invention, there is provided a program (hereunder referred to as a fifth program of the present invention) for causing a computer to perform an information processing process of receiving and processing data transmitted from a transmitter. The fifth program of the present invention includes a data receiving step (associated with the processing performed by the authenticator 21 shown in FIG. 3) of receiving data that is transmitted from the transmitter and includes large volume data, which is data of large volume, a notification information transmitting step (associated with, for example, the processing step S18 of the program illustrated in FIG. 6) of transmitting notification information, which notifies the presence of the large volume data, to the receiver through a narrowband communication circuit, and a large volume data transmitting step (associated with the processing step S37 of the program illustrated in FIG. 8) of transmitting the large volume data to the receiver, which has made a request, through a broadband communication circuit in response to the request therefrom. According to the fifth program of the present invention, at least one of the narrowband communication circuit and the broadband communication circuit is a wireless circuit.

According to another aspect of the present invention, there is provided a receiver (hereunder referred to as a second receiver of the present invention) for receiving data from an information processor, which receives and processes data transmitted from a transmitter. The second receiver of the present invention includes notification information receptacle (associated with, for example, the receiver 61 shown in FIG. 9) for receiving from the information processor notification information notifying presence of large volume data, which is data of large volume and sent from the transmitter to the information processor, through a narrowband communication circuit, request means (associated with, for example, the video mail request command generator 63) for requesting the large volume data of the information processor according to the notification information, and large volume data receptacle (associated with, for example, the receiver 61 shown in FIG. 9) for receiving the large volume data, which is transmitted from the information processor in response to the request therefor, through a broadband communication circuit. According to the second receiver of the present invention, at least one of the narrowband communication circuit and the broadband communication circuit is a wireless circuit.

According to another aspect of the present invention, there is provided a receiving method (hereunder referred to as a second receiving method of the present invention) of receiving data from an information processor, which receives and processes data transmitted from a transmitter. The second receiving method of the present invention includes a notification information receiving step (associated with, for example, the processing step S51 of the program illustrated in FIG. 10) of receiving from the information processor notification information notifying the presence of large volume data, which is data of large volume and sent from the transmitter to the information processor, through a narrowband communication circuit, a request step (associated with, for example, the processing step S51 shown in FIG. 10) of requesting the large volume data of the information processor, and a large volume data receiving step (associated with, for example, the processing step S56 shown in FIG. 10) of receiving the large volume data, which is transmitted from the information processor in response to the request therefor, through a broadband communication circuit. According to the second receiving method, at least one of the narrowband communication circuit and the broadband communication circuit is a wireless circuit.

According to another aspect of the present invention, there is provided a program (hereunder referred to as a sixth program of the present invention) for causing a computer to perform a receiving process of receiving data from an information processor, which receives and processes data transmitted from a transmitter. The sixth program of the present invention includes a notification information receiving step (associated with, for example, the processing step S51 of the program illustrated in FIG. 10) of receiving from the information processor notification information notifying the presence of large volume data, which is data of large volume and sent from the transmitter to the information processor, through a narrowband communication circuit, a request step (associated with, for example, the processing step S51 shown in FIG. 10) of requesting the large volume data of the information processor, and a large volume data receiving step (associated with, for example, the processing step S56 shown in FIG. 10) of receiving the large volume data, which is transmitted from the information processor in response to the request therefor, through a broadband communication circuit. According to the sixth program of the present invention, at least one of the narrowband communication circuit and the broadband communication circuit is a wireless circuit.

According to the first information processing system, the first information processing method, and the first program of the present invention, the information processor receives large volume data, which includes data of large volume and is transmitted from a transmitter and also includes a destination. Then, the information processor transmits notification information, which notifies the presence of the large volume data, to the receiver, which is the destination of the large volume data, through the narrowband communication circuit. Thereafter, in response to the request from the receiver, the information processor transmits the large volume data to the receiver, which has made the request, through the broadband communication circuit. The receiver receives the notification information, which is destined for itself, through the narrowband communication circuit, and requests the large volume data of the information processor according to the notification information. Then, the receiver receives the large volume data, which is transmitted from the information processor in response to the request therefor, through the broadband communication circuit.

According to the first information processor, the second information processing method, and the second program of the present invention, data including large volume data, which is data of large volume and transmitted from the transmitter, and also including the destination are received. Then, notification information, which notifies the presence of the large volume data, is transmitted to the receiver, which is the destination of the large volume data, through the narrowband communication circuit. In response to the request from the receiver, the large volume data is transmitted to the receiver, which has made the request therefor, through the broadband communication circuit.

According to the first receiver, the first receiving method, and the third program of the present invention, the notification information notifying the presence of large volume data, which is transmitted by a transmitter to the information processor and destined for the receiver, is received from the information processor through the narrowband communication circuit. According to the notification information, the large volume data is requested of the information processor. Then, the large volume data transmitted from the information processor in response to the request therefor is received through the broadband communication circuit.

According to the second information processing system, the third information processing method, and the fourth program of the present invention, the information processor receives large volume data, which includes data of large volume and is transmitted from the transmitter and also includes the destination. Then, the information processor transmits notification information, which notifies the presence of the large volume data, to the receiver through the narrowband communication circuit. Then, in response to the request from the receiver, the information processor transmits the large volume data to the receiver, which has made the request, through the broadband communication circuit. The receiver receives the notification information through the narrowband communication circuit, and requests the large volume data of the information processor according to the notification information. Thereafter, the receiver receives the large volume data, which is transmitted from the information processor in response to the request therefor, through the broadband communication circuit. At least one of the narrowband communication circuit and the broadband communication circuit is a wireless circuit.

According to the second information processor, the fourth information processing method, and the fifth program of the present invention, data including large volume data, which is data of large volume and transmitted from the transmitter, and also including the destination are received. Then, notification information, which notifies the presence of the large volume data, is transmitted to the receiver through the narrowband communication circuit. In response to the request from the receiver, the large volume data is transmitted to the receiver, which has made the request therefor, through a broadband communication circuit. At least one of the narrowband communication circuit and the broadband communication circuit is a wireless circuit.

According to the second receiver, the second receiving method, and the sixth program of the present invention, notification information notifying the presence of large volume data, which is transmitted by the transmitter to the information processor, is received from the information processor through the narrowband communication circuit. According to the notification information, the large volume data is requested of the information processor. Then, the large volume data transmitted from the information processor in response to the request therefor is received through the broadband communication circuit. At least one of the narrowband communication circuit and the broadband communication circuit is a wireless circuit.

According to the preferred embodiments of the present invention, a user can be promptly informed of the presence of large volume data. Also, the large volume data can be provided to the user at low cost.

BRIEF DESCRIPTION OF THE DRAWINGS

The above and other objects and features of the present invention will become more readily apparent to those of ordinary skill in the art from the following detailed description taken in conjunction with the accompanying drawings in which:

FIG. 11 is a block diagram illustrating the hardware configuration of a computer implementing the information processing system according to the present invention.

DETAILED DESCRIPTION OF THE PREFERRED EMBODIMENTS

Hereinafter, preferred embodiments of the present invention are described.

Figure 1:
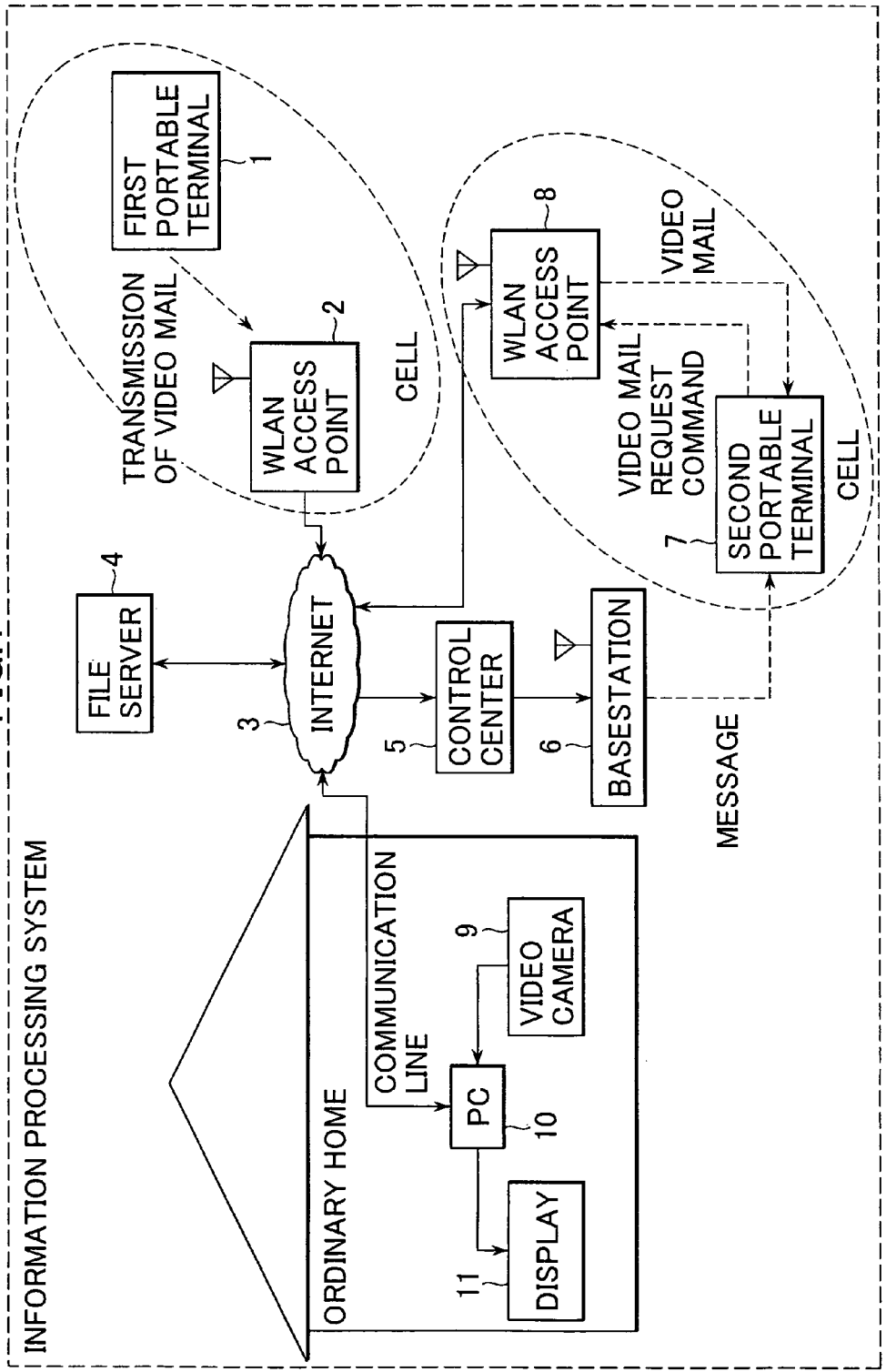
FIG. 1 is a diagram illustrating the configuration of an information processing system that is an embodiment of the present invention.

FIG. 1 is a diagram illustrating the configuration of an information processing system that is an embodiment of the present invention. The information processing system shown in FIG. 1 includes a first portable terminal 1, a WLAN access point 2, the Internet 3, a file server 4, a control center 5, a base station 6, a second portable terminal 7, a WLAN access point 8, a video camera 9, a PC (Personal Computer) 10, and a display 11.

In the information processing system shown in FIG. 1, users of, for example, the first portable terminal 1, the second portable terminal 7, and the PC 10 are preliminarily registered in the file server 4 as users of the file server 4. When utilizing the file server 4, the user needs to be authenticated as that of the file server 4.

The first portable terminal 1 is enabled to capture a motion picture. Also, the first portable terminal 1 has the functions of transmitting and receiving emails and WLAN function. Thus, the first portable terminal 1 creates an email including an email body, which is a text document, and using a mail address of one of users of the second portable terminal 7, the PC 10 and so on as a destination address. Then, the first portable terminal 1 creates a motion picture mail (hereunder sometimes referred to as a video mail) by attaching the captured motion picture to the email. In the system shown in FIG. 1, the first portable terminal 1 exists in a cell of the WLAN access point 2 and can send created video mails to the WLAN access point 2 through the WLAN that is broadband communication circuits.

The WLAN access point 2 functions as an access point that performs wireless communication with a wireless communication device at a high transfer rate in conformity to WLAN standards. In other words, the WLAN access point 2 sends data, which is transmitted from a wireless communication device that exists in the cell, to another wireless communication device, which also exists in the cell, and to the Internet 3. Also, the WLAN access point 2 sends data, which is transmitted from the Internet 3, to a wireless communication device that exists in the cell thereof. In the system shown in FIG. 1, the first portable terminal 1 exists in the cell of the WLAN access point 2. Therefore, when a video mail is wirelessly sent to the WLAN access point 2 from the first portable terminal 1, the WLAN access point 2 receives this video mail and transmits the received video mail to, for instance, the Internet 3. By the way, communication between the WLAN access point 2 and each of the first portable terminal 1 and the Internet 3 can be performed at a high transfer rate.

In the system shown in FIG. 1, the WLAN access points 2, 8, the file server 4, the control center 5, and the PC 10 are connected to the Internet 3. Thus, the system is adapted so that communication among them can be performed through the Internet 3.

The file sever 4 is connected to the Internet 3 and provides video mail services (to be described later) by utilizing broadband communication circuits, which include the WLAN access points 2 and so on, and narrowband communication circuits provided by the base station 6 of the portable telephone system (including a PHS (Personal Handy-phone System) and so forth.

The control center 5 controls many base stations (not shown) including the base station 6 and provides portable telephone services (wireless communication services). The control center 5 is connected to the Internet 3 and enables communication between the base station 6 and the Internet 3 by connecting the base station 6 to the Internet 3.

The base station 6 is controlled by the control center 5 and exchanges data or the like with portable terminals, such as potable telephones, which exist in the cell, by wireless communication through narrowband communication circuits that conform to portable telephone standards. The base station 6 is connected to the control center 5 and sends data or the like, which is transmitted from the control center 5, to the portable terminals in the cell and also sends data or the like, which is transmitted from the portable terminals in the cell, to the control center 5.

By the way, although not shown, many base stations are installed and provide portable telephone services in a wide area. In the system shown in FIG. 1, both the first portable terminal 1 and the second portable terminal 7 exist in the areas in which the portable telephone services are provided.

The second portable terminal 7 is constructed, similarly as, for example, the first portable terminal 1. By the way, in the system shown in FIG. 1, the second portable terminal 7 exists in the cell of the WLAN access point 8.

Meanwhile, the first portable terminal 1 and the second portable terminal 7 can be constituted by, for instance, potable telephones or PDAs (Personal Digital Assistants).

The WLAN access point 8 is connected to the Internet 3 and provides wireless communication services through a broadband communication circuits, similarly as the WLAN access point 2.

By the way, the number of installed WLAN access points, such as the WLAN access points 2 and 8, is small at present. Therefore, the service areas of the wireless communication services are limited, as compared with those of portable telephone.

The video camera 9, the PC 10, and the display 11 are provided in the user's house.

The video camera 9 captures a motion picture. The motion picture captured by the video camera 9 can be outputted to, for example, the PC 10.

The PC 10 is connected to the Internet 3 and enabled to perform various kinds of data communication therebetween. By the way, broadband communication circuits, such as ADSL (Asymmetric Digital Subscriber Line) networks and CATV (Cable Television) networks are used for connection between the PC 10 and the Internet 3.

The display 1 is constituted by, for example, a television receiver and shows (or outputs) a television broadcast program. By the way, the display 11 can be connected to the PC 10. In this case, a motion picture can be transmitted thereto and displayed on a screen thereof. The display 11 may be constituted by a projector, a screen and so on of a home theater system, instead of the television receiver.

Figure 2:
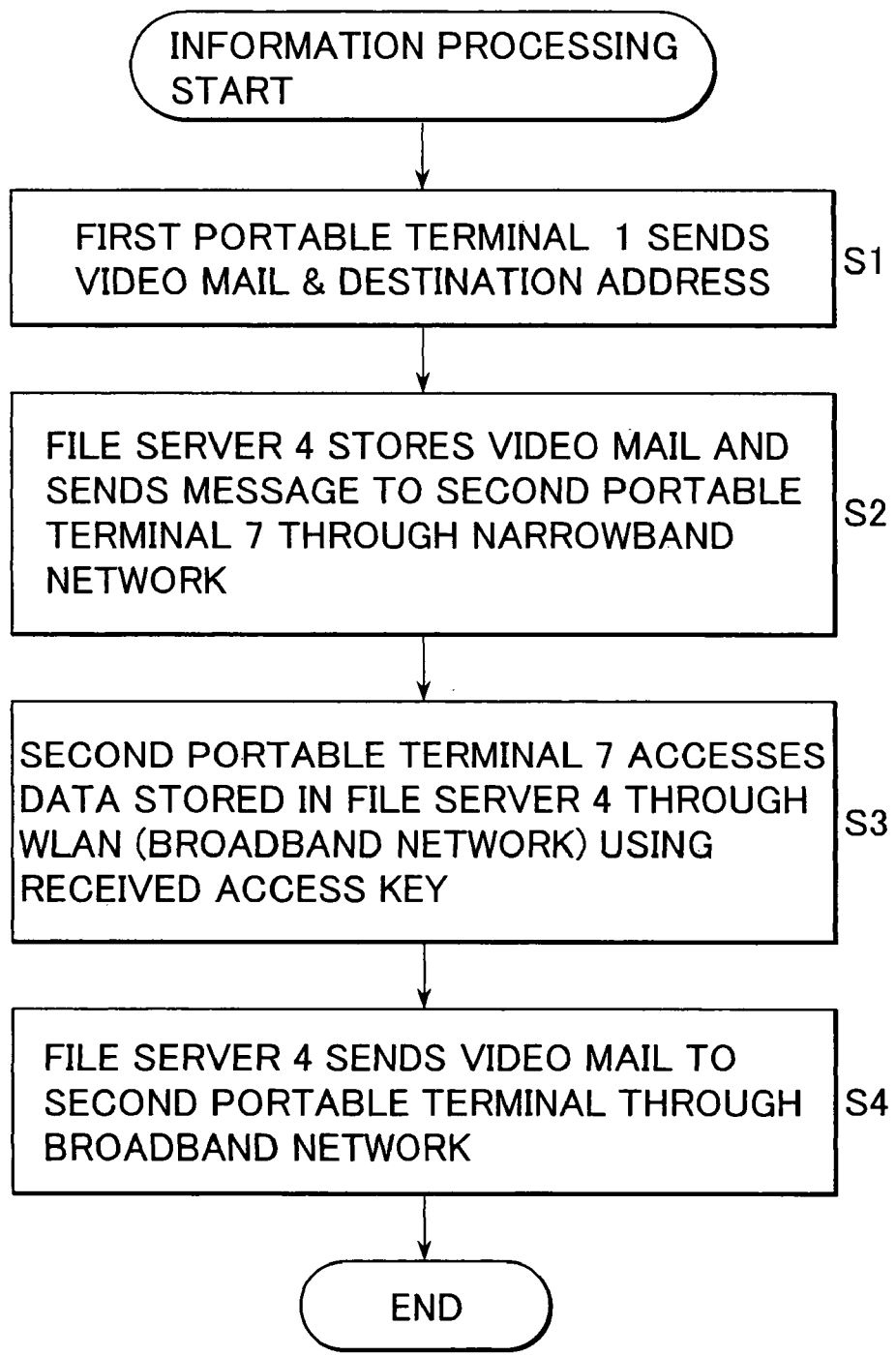
FIG. 2 is a flowchart illustrating an outline of processing to be performed by the information processing system.

FIG. 2 is a flowchart illustrating an outline of a process to be performed in a case where a video mail is sent from the first portable terminal to the second portable terminal 7. By the way, it is assumed that the first portable terminal 1 exists in a cell of the WLAN access point 2, and that the second portable telephone 7 exists at least in an area in which portable telephone services are provided thereto, for example, in a cell of the base station 6.

In step S1, the first potable terminal 1 creates a video mail in response to an operation performed by a user and sends the created video mail by setting the second portable terminal 7 to be the destination of the video mail. The video mail sent by the first portable terminal 1 is transmitted to the file server 4 through the broadband wireless communication circuit provided by the WLAN access point 2 and through the Internet 3.

Thereafter, the process advances to step 2, whereupon the file server 4 receives and stores the video mail sent from the first portable terminal 1. Also, the file server 4 sends a message (notification information) indicating the presence of the video mail to the second portable terminal 7, which is the destination of the video mail, by a text-only email. Then, the process proceeds to step S3.

An email (hereunder sometimes referred to as a "notification mail") sent by the file server 4 as notification information is transmitted to the second portable terminal 7, which is a destination of the video mail, through the Internet 3, the control center 5, and the wireless communication circuit used by the portable telephone, which is a narrowband communication circuit provided by the base station 6. The second portable terminal 7 receives this notification mail.

In step S3, the user of the second portable terminal 7 operates the second portable terminal 7 and sends a motion picture request message, which includes an access key described in the notification mail, to the file server 4 when he is present or moves in the cell of the WLAN access point 8. Then, the process advances to step S4. The request message sent by the second portable terminal 7 is transmitted to the file server 4 through the broadband communication circuit, which is provided by the WLAN access point 8, and the Internet 3.

In step S4, the file server 4 receives the request message sent from the second portable terminal 7. Also, in step S4, in response to the request message, the file server 4 transmits the video mail, which is sent from the first portable terminal 1 to the user of the second portable terminal 7, to the second portable terminal 7 through the Internet 3 and the broadband communication circuit provided by the second portable terminal 7. Then, the process is finished.

Therefore, the user of the second portable terminal 7 can instantaneously notice the presence of the video mail through the notification mail sent through the communication circuit used by the portable telephone. Thus, the user of the second portable terminal 7 can receive a large capacity video mail at low cost through WLAN.

Figure 3:
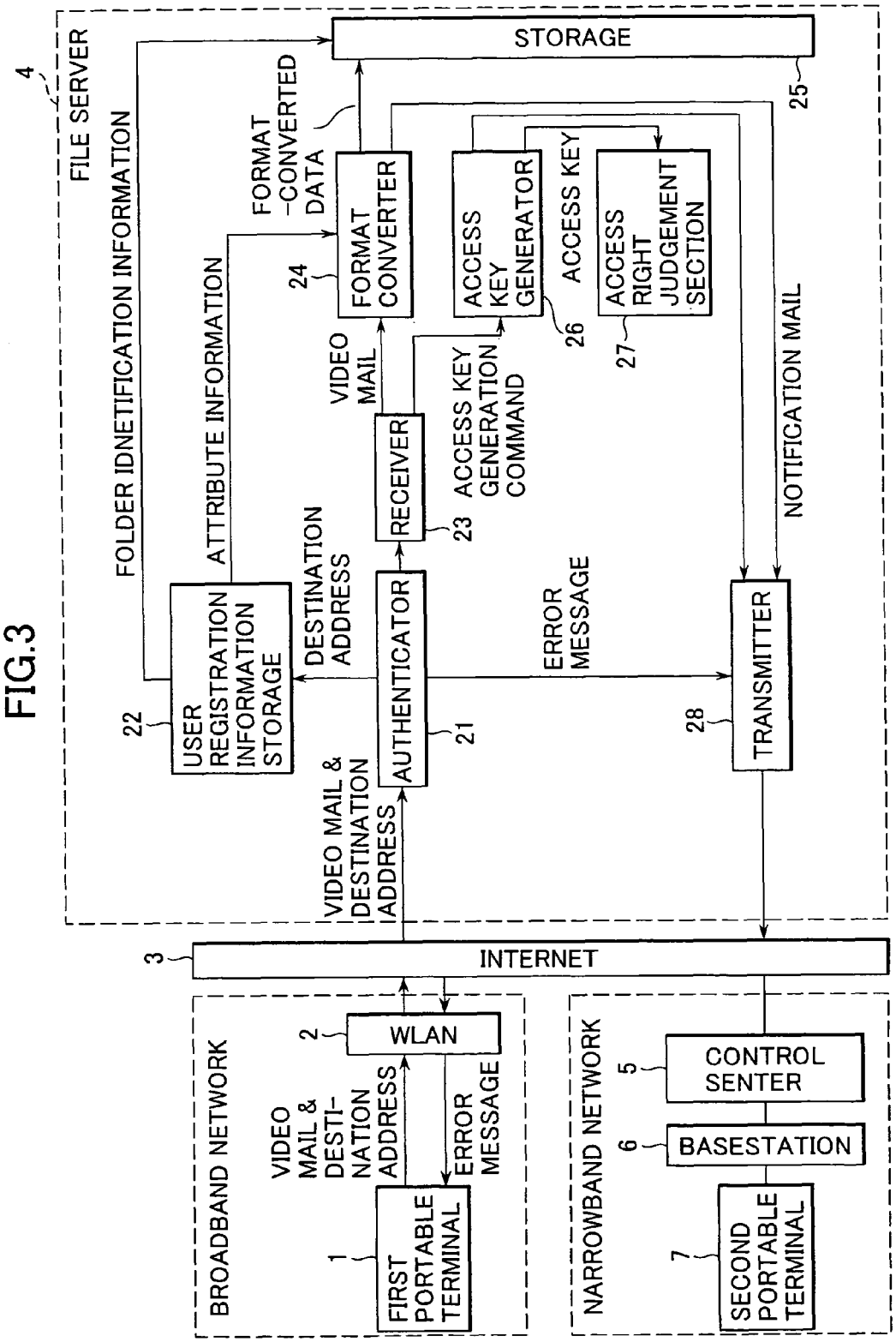
FIG. 3 is a block diagram illustrating the configuration of a portion of a file sever.

FIG. 3 is a block diagram illustrating the configuration of components of the file sever 4, which are associated with the process (hereunder sometimes referred to as a "first-half process") performed in steps S1 and S2 of FIG. 2.

The file server 4 shown in FIG. 3 includes an authenticator 21, a user registration information storage 22, a receiver 23, a format converter 24, a storage 25, an access key generator 26, an access right judgment section 27, and a transmitter 28.

Hereinafter, the configuration of the file server 4 is described by assuming that a sender is the first portable terminal 1, and that a destination is the second portable terminal 7.

The authenticator 21 receives a video mail sent from the first portable terminal 1 and authenticates a user of the first portable terminal 1, which is a sender, and a user of the second portable terminal 7, which is a destination.

In other words, to enjoy services provided by the file server 4, it is necessary that the users, who are the sender and the destination of the video mail, need to preliminarily register user information with the file server 4. The authenticator 21 performs authentication for checking whether the users are registered ones. If the authentication is successful, the authenticator 21 outputs a mail address of the second portable terminal 7, which is the destination of the video mail sent from the first portable terminal 1, to the user registration information and also outputs the video mail to the receiver 23.

Conversely, if the authentication is failed, in other words, if one or both of the users of the first portable terminal 1 and the second portable terminal 7 are not registered users (users having registered user information), the authenticator 21 creates an error message indicating that the services are unavailable to the user. Then, the authenticator 21 outputs the error message to the transmitter 28. This error message is sent from the transmitter 28 to the first portable terminal 1.

The user registration information storage 22 stores the mail addresses of the registered users, attribute information of devices used by the registered users for transmitting and receiving mails, and folder identification information for identifying folders allocated to the registered users by associating these data and information with one another. When the mail address of the user of the second portable terminal 7, which is the destination of the video mail, is inputted by the authenticator 21 to the user registration information storage 22, this storage outputs the attribute information of the second portable terminal 7 associated with the video mail and the associated folder identification information to both the format converter 24 and the storage 25.

When the video mail outputted from the authenticator 21 is inputted to the receiver 23, this receiver outputs the video mail to the format converter 25. Also, the receiver 23 creates an access key generation command to generate an access key for accessing (or downloading) the inputted video mail. Then, the receiver 23 outputs this command to the access key generator 26.

The format converter 24 format-converts a motion picture attached to the video mail, which is outputted from the receiver 23, according to the attribute information, which is outputted from the user registration information storage 22 and associated with the user of the second portable terminal 7 that is the destination of the video mail, in compliance with the format used in the destination terminal. Then, the format converter 24 outputs the format-converted video mail to the storage 25. In other words, the attribute information includes at least information on the formats of a motion picture file which is available in the device used by the user for transmitting and receiving video mails. The format-converter 24 converts the format of the motion picture file, which is attached to the video mail sent to the user of the second portable terminal 7, to a format, which is available in the second portable terminal 7, according to the attribute information of the user of the second portable terminal 7. Also, the format-converter 24 deletes the motion picture, which is attached to the video mail, from this video mail and outputs the remaining text part to the transmitter 28 as a notification mail.

The storage 25 identifies a folder assigned to the user of the second portable terminal 7, which is the destination, at the user registration of this user according to folder identification information, which is inputted from the user registration information storage 22. Then, the storage 25 stores the format-converted video mail, which is destined for the user of the second portable terminal 7, in the identified folder.

Figure 4:
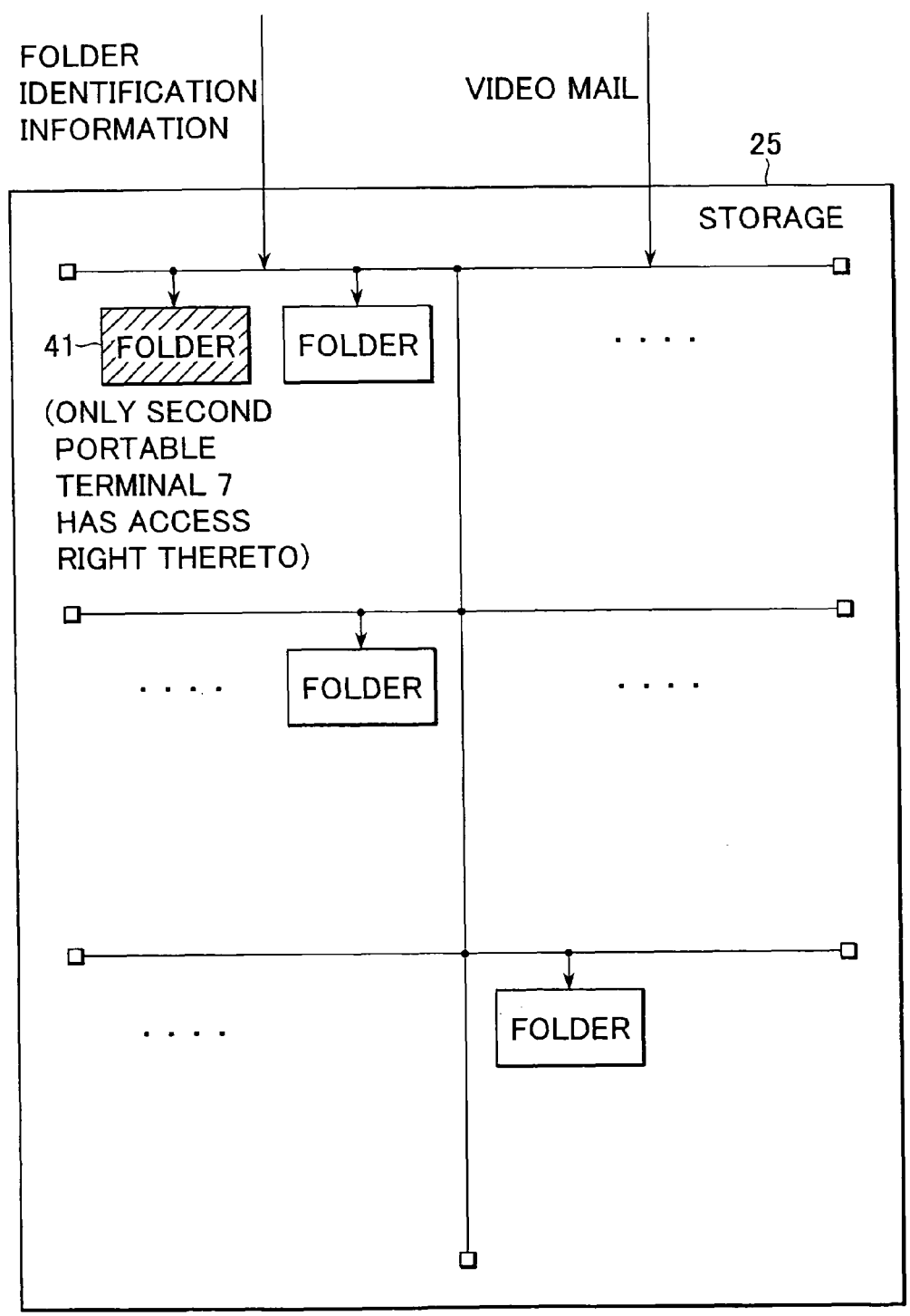
FIG. 4 is a diagram illustrating the logical configuration of storage 25.

Referring now to FIG. 4, there is shown the logical configuration of the storage 25 shown in FIG. 3. In the storage 25, folders respectively assigned to the registered users, each of which has an access right to the folder assigned thereto, are created. The storage 25 identifies a folder (a folder 41 shown in FIG. 4), to which only the user of the second information terminal 7 has an access right, according to the folder identification information outputted from the user registration information storage 22. Then, the storage 25 stores the video mail, which is sent to the user of the second portable terminal 7, in the identified folder.

By the way, in the storage 25, a folder is created corresponding to, for example, one registered user. In the case that a registered user discontinues use of the services provided by the file server 4 and cancels the user registration, the storage 25 deletes the folder to which this registered user has an access right.

Figure 5:
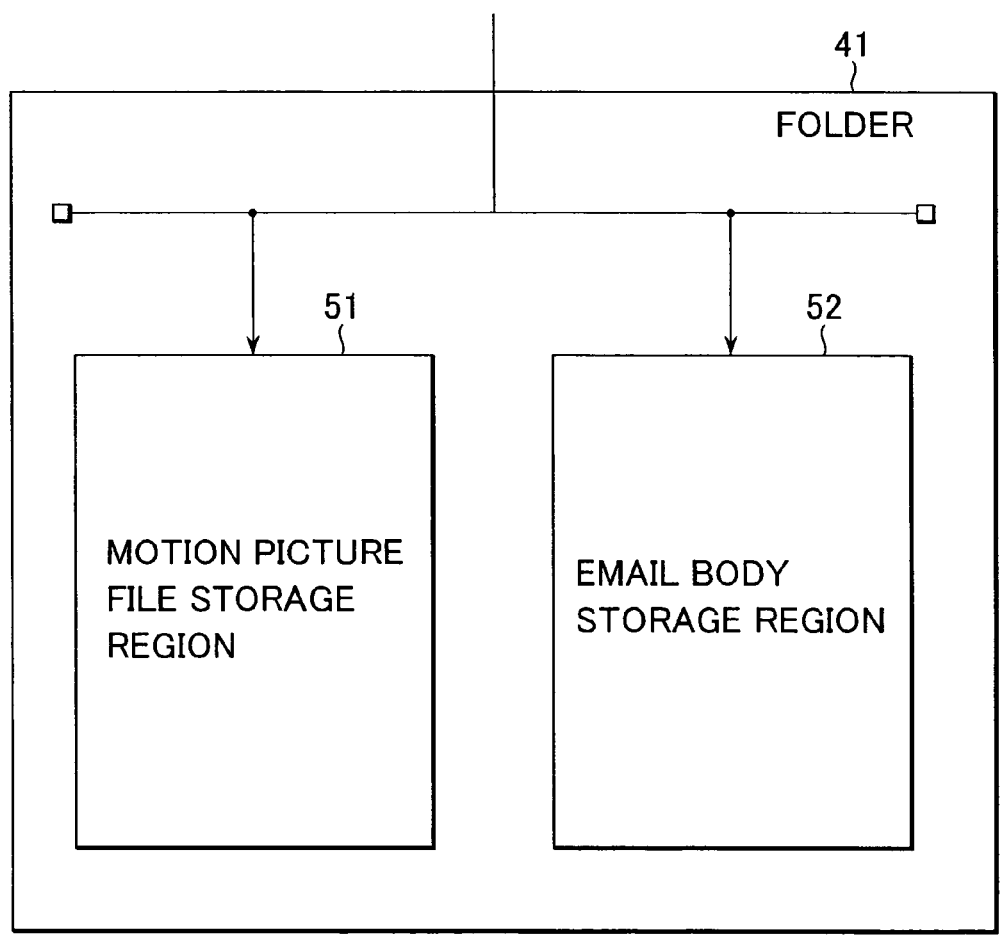
FIG. 5 is a diagram illustrating storage regions of a folder of the storage 25.

FIG. 5 illustrates the logical configuration of the folder 41 constituting the storage 25 shown in FIG. 4. The folder 41 includes a motion picture file storage region 51 and an email body storage region 52.

By the way, the folder 41 shown in FIG. 5 is assigned to the user of the second portable terminal 7. Thus, only the user of the second portable terminal can access the folder 41.

In the motion picture file storage region 51, a motion picture file attached to the video mail having been sent to the user of the second portable terminal 7, to which the folder 41 is assigned, is stored.

In the email body storage region 52, a text part of the video mail sent to the user of the second portable terminal, to which the folder 41 is assigned, is stored.

Referring back to FIG. 3, the access key generator 26 receives the access key generation command outputted from the receiver 23 and generates a unique access key for accessing the vide mail received when the access key generation command is generated at the receiver 23. Then, the access key generator 26 supplies the generated access key to the access right judgment section 27 and the transmitter 28.

The access right judgment section 27 stores the access key supplied from the access key generator 26.

The transmitter 28 sends an error message, which is supplied from the authenticator 21 to the user of the first portable terminal 1, to the first portable terminal 1. Also, the transmitter 28 adds an access key, which is outputted from the access key generator 26, to a notification mail outputted from the format converter 24, and then transmits the notification mail to the second portable terminal 7.

This transmission of the error message from the file server 4 to the first portable terminal 1 enables the user of the first portable terminal 1 to know that the user of the first portable terminal 1 or the second portable terminal 7, which is the destination, is not a registered user.

Also, according to this file server 4, the small capacity notification mail consisting of the text part of the video mail and the access key is transmitted through a portable telephone network, in other words, a communication circuit whose transmission band is a narrowband and whose service areas are broad, as will be described later. Consequently, the file server 4 can instantaneously notify the user, which is associated with the second portable terminal 7, of the reception of the video mail at low cost.

Figure 6:
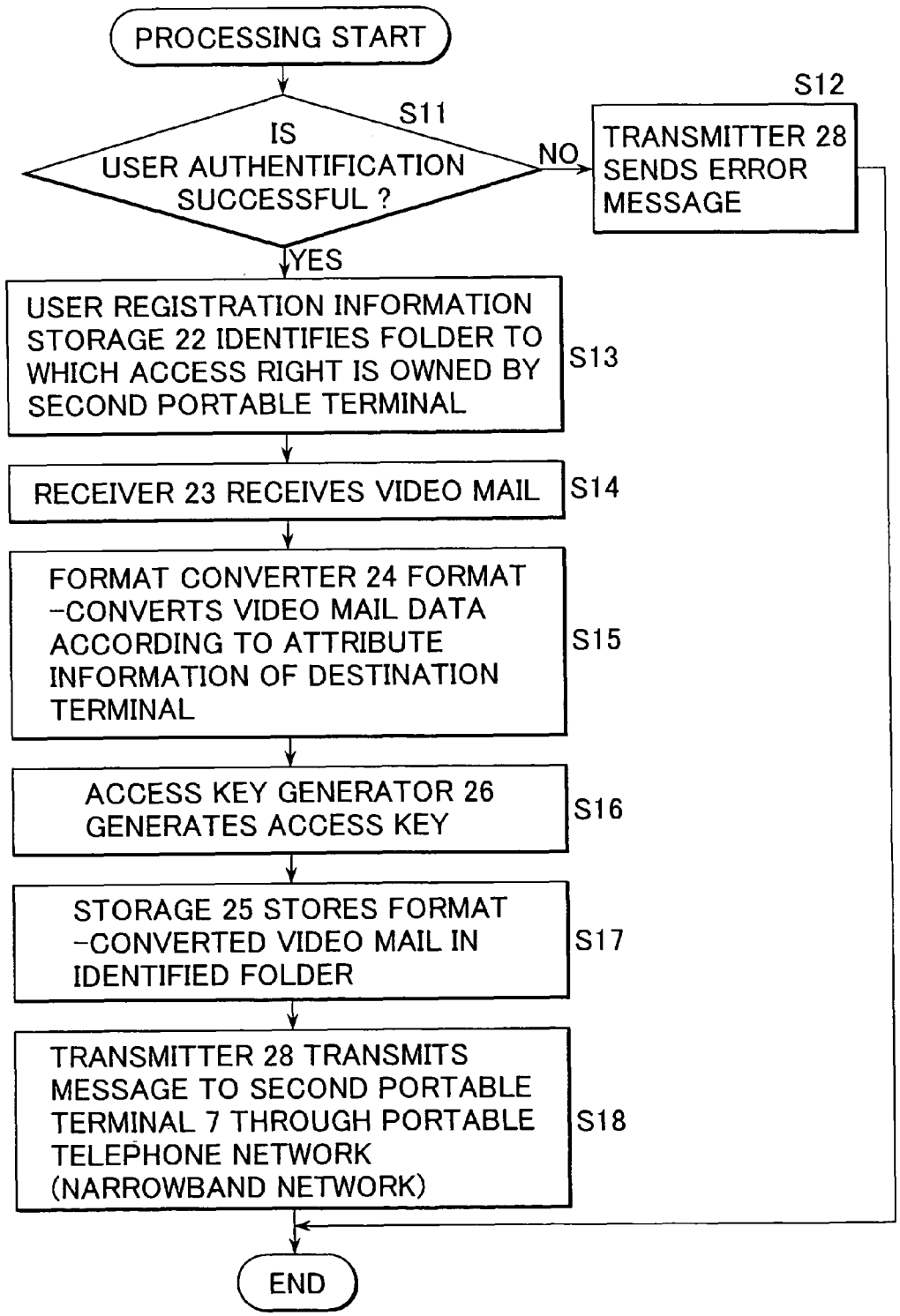
FIG. 6 is a flowchart illustrating a first-half process to be performed by the file server.

FIG. 6 is a flowchart illustrating a process (in other words, the first-half process) in which the file server 4 shown in FIG. 3 receives the video mail and notifies the destination of the reception of the video mail.

By the way, the process illustrated in FIG. 6 is commenced when the video mail to be sent to the user of the second portable terminal 7 is transmitted from the first portable terminal 1 to the file server 4 through the WLAN access point 2 and the Internet 3.

In step S11, the authenticator 21 receives the video mail sent from the first portable terminal 1 and authenticates the user of the first portable terminal 1, which is the sender, and the user of the second portable terminal 7, which is the destination. Also, in step S11, the authenticator 21 decides whether or not the authentication is successful. If the authenticator 21 decides in step S11 that the authentication is failed, the process advances to step S12, whereupon the transmitter 28 sends an error message to the first portable terminal 1 having transmitted the video mail thereto. Then, the process is finished.

Conversely, if the authenticator 21 decides in step S11 that the authentication is successful, the authenticator 21 obtains a mail address of the second portable terminal 7, which is the destination of the video mail sent from the first portable terminal 1, from the video mail and supplies the mail address to the user registration information storage 22. Subsequently, the process proceeds to step S13, whereupon the user registration information storage 22 supplies folder identification information and attribute information, which are associated with the mail address supplied from the authenticator 21, to the storage 25 and the format converter 24. Also, in step S13, the storage 25 identifies a folder assigned to the user of the second portable terminal 7, which is the destination, according to the folder identification information supplied from the user registration information storage 22. Then, the process proceeds to step S14.

In step S14, the receiver 23 receives the video mail from the authenticator 21 and outputs the received video mail to the format converter 24. Also, the receiver 23 outputs an access key generation command to the access key generator 26. Then, the process advances to step S15.

In step S15, the format converter 26 format-converts (the motion picture file of) the video mail outputted from the receiver 23. Subsequently, the format converter 26 outputs the format-converted video mail to the storage 25. Also, the format converter 26 outputs only a text part of the video mail to the transmitter 28 as a notification mail. Then, the process proceeds to step S16.

In step S16, the access key generator 26 generates an access key according to the access key generation command inputted from the receiver 23. Then, the access key generator 26 outputs the generated access key to the access right judgment section 27, which stores the access key, and to the transmitter 28. Subsequently, the process advances to step S17.

In step S18, the transmitter 28 adds the access key, which is outputted from the access key generator 27, to the notification mail, which is outputted from the format converter 24, and subsequently, sends the notification mail to the second portable terminal 7 through the portable telephone network, which is a narrowband network provided at the control center 5 and the base station 6 and has a broad service area. Thus, the process is finished.

Figure 7:
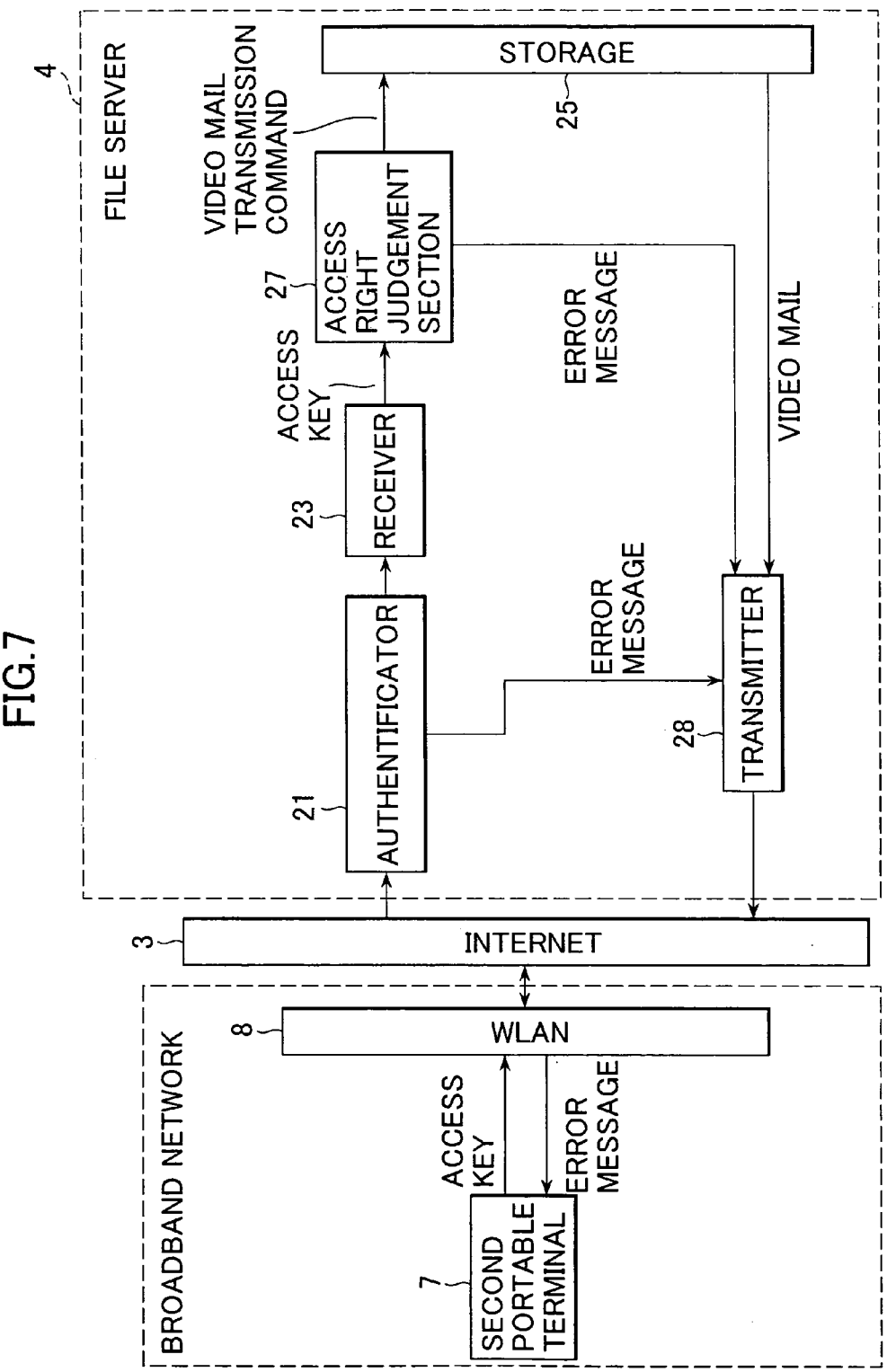
FIG. 7 is a block diagram illustrating the configuration of another part of the file server.

FIG. 7 is a block diagram illustrating the configuration of components of the file sever 4, which are associated with the process (hereunder sometimes referred to as a "second-half process") performed in steps S3 and S4 of FIG. 2. By the way, components associated with those shown in FIG. 3 are designated by the same reference characters. Thus, the redundant description of the components is omitted herein for brevity of description.

As described above, a small capacity notification mail is transmitted from the file server 4 to the second portable terminal 7 through the portable telephone network that is a narrowband network and has a broad service area. The second portable terminal 7 receives the notification mail from the file server 4. This notification mail informs the user, which is associated with the second portable terminal 7, of the presence of the video mail to be sent thereto. Subsequently, when the user of the second potable terminal 7, which exists in the cell of the WLAN access point 8, or when the user thereof, which has been absent in a cell of the WLAN access point 8 and thereafter has moved into the cell thereof, operates the second portable terminal 7 in such a way as to request a video mail, the second portable terminal 7 adds the access key included in the notification mail, and the own mail address to a request message for requesting a video mail, and then outputs the request message to the file server 4 through broadband wireless circuit, which is provided by the WLAN access point 8, and the Internet.

In the file server 4 shown in FIG. 7, the authenticator 21 receives the request message sent from the second portable terminal 7 in the above-mentioned manner. Then, according to the mail address of the user of the second portable terminal 7, which is included in the request message, the authenticator 21 performs authentication to check whether or not the user of the second portable terminal 7 is a registered user.

In a case where the user of the second portable terminal 7 is authenticated as a registered user, the authenticator 21 outputs the access key included in the request message, which is transmitted from the second portable terminal 7, to the receiver 23. Conversely, if the authentication is failed, the authenticator 21 supplies an error message to the transmitter 28, which then sends the error message to the second portable terminal 7.

The receiver 23 receives access key outputted from the authenticator 21 and then outputs the access key to the access right judgment section 27.

A video mail transmission command (to be described later) outputted from the access right judgment section 27 is inputted to the storage 25. Subsequently, the storage 5 reads a video mail, which is identified by the inputted video mail transmission command, from a folder and outputs the read video mail to the transmitter 28. By the way, instead of the video mail, only a motion picture file attached to the video mail can be read from the storage 25.

The access right judgment section 27 judges according to the access key inputted from the receiver 23 whether or not the user of the second portable terminal 7 having transmitted the access key has an access right to the video mail stored in the storage 25. According to a result of the judgment, the access right judgment section 27 outputs a video mail transmission command to the storage 25, alternatively, outputs an error message to the transmitter 28.

In other words, as illustrated in FIG. 3, the access key generated for accessing the video mail is held in the access key generator 26. In a case that one of the access keys held by the judgment section 27 itself is the same as the access key received from the second portable terminal 7, the access right judgment section 27 outputs a video mail transmission command, which instructs the storage 25 to transmit the video mail identified by the access key sent from the second portable terminal 7, to the storage 25.

Conversely, in a case that none of the access keys held by the access right judgment section 27 itself are the same as the access key received from the second portable terminal 7, the access right judgment section 27 judges that the user of the second portable terminal 7 does not have an access right thereto. In this case, the access right judgment section 27 supplies an error message to the transmitter 28, which then transmits the second portable terminal 7.

The transmitter 28 transmits the error message sent from the authenticator 21, the error message sent from the access right judgment section 27, and the video mail sent from the storage 25 to the second portable terminal 7 through the Internet 3 and the wireless communication circuit that is provided by the WLAN access point 8 and that is a broadband network and has a narrow service area.

Figure 8:
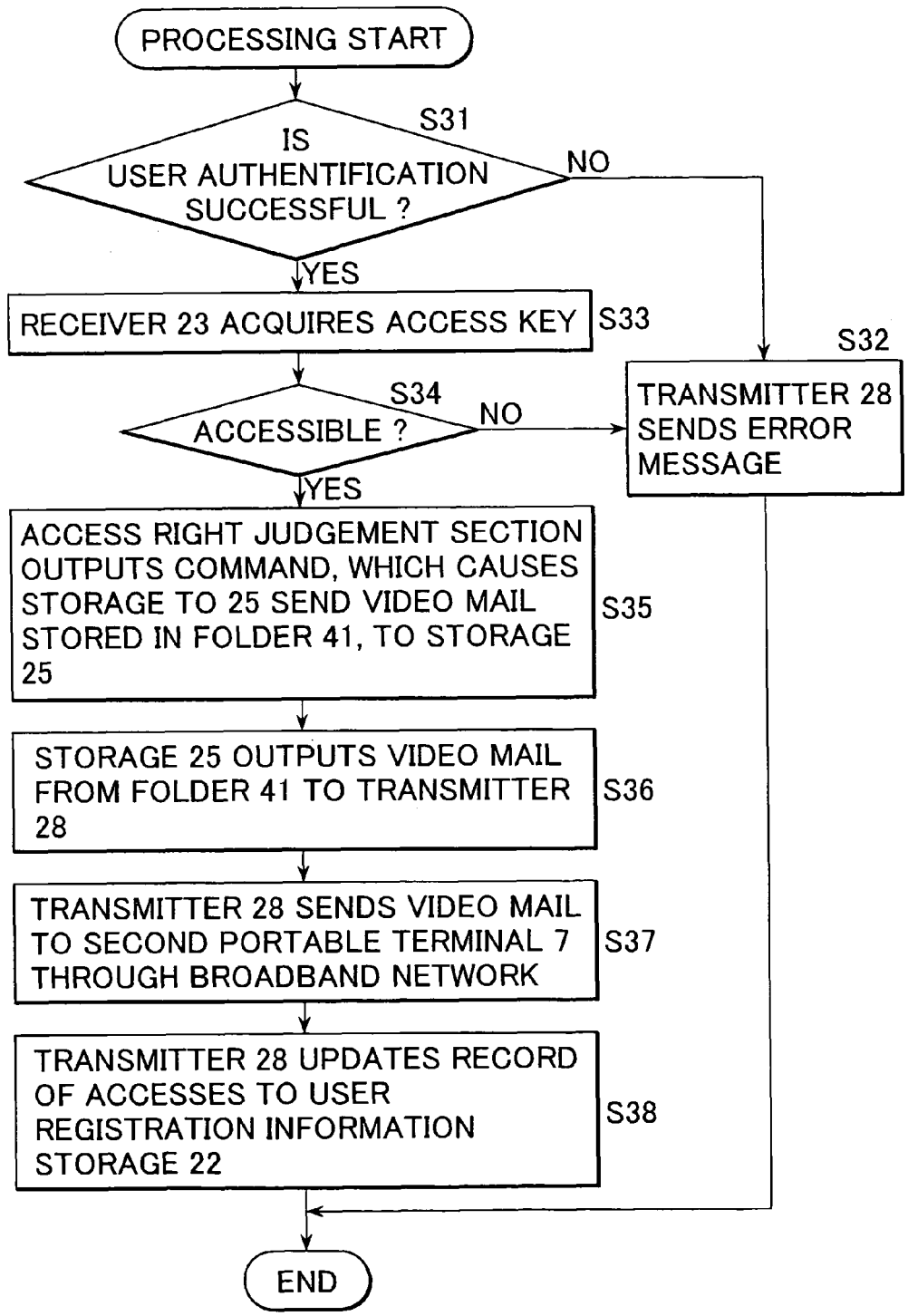
FIG. 8 is a flowchart illustrating a second-half process to be performed by the file server.

FIG. 8 is a flowchart illustrating an operation of the file server 4 shown in FIG. 7. By the way, the process illustrated in FIG. 8 is commenced when the second portable terminal 7 sends a request message, which requests transmission of a video mail, to the file server 4 and this request message is received by the authenticator 21.

In step S31, the authenticator 21 authenticates the user of the second portable terminal 7 having transmitted the request message, and judges whether or not authentication is successful. In step S31, if the authenticator 21 judges that the authentication is failed, the process advance to step S32, whereupon the authenticator 21 control the transmitter 28 in such a way as to transmit an error message to the second portable terminal 7. Then, the process is finished.

Also, in step S31, if the authenticator 21 judges that the authentication is successful, the process proceeds to step S33.

In step S33, the receiver 23 acquires an access key included in the request message from the authenticator 21 and outputs the access key to the access right judgment section 27. Then, the process advances to step S34.

In step S34, according to whether one of the access keys inputted to the access right judgment section 27 and the access keys preliminarily held by the judgment section 27 itself is the same as the access key received from the second portable terminal 7, the access right judgment section 27 judges whether or not the user of the second portable terminal 7 has an access right to the video mail. In step S34, if the authenticator 27 judges that the user of the second portable terminal 7 does not have the access right, the process goes further to step S32. Then, as above-mentioned, an error message is transmitted to the second portable terminal 7. Subsequently, the process is finished.

Also, in step S34, if the authenticator 27 judges that the user of the second portable terminal 7 has the access right, the process proceeds to step S35.

In step S35, the access right judgment section 27 generates a video mail transmission command, which instructs the storage 25 to transmit the video mail identified by the access key and sent to the user of the second portable terminal 7, from the access key sent by the receiver 23 and outputs this command to the storage 25. Then, the process advances to step S37.

In step S36, the storage 25 reads the video mail, which is designated by the video mail transmission command, from the folder 41, to which the user of the second portable terminal 7 has an access right, according to the video mail transmission command sent from the access right judgment section 27. Also, the storage 25 outputs the read video mail to the transmitter 28. Then, the process advances to step S37.

In step S37, the transmitter 28 sends a large capacity video mail received from the storage 25 to the second portable terminal 7 through the Internet 3 and the broadband wireless communication circuit provided by the WLAN access point 8. Then, the process advances to step S38.

In step S38, the transmitter 28 registers the latest access information, which indicates that the second portable terminal 7 accesses the video mail stored in the folder 41 shown in FIG. 4, in a log file (not shown). Thus, the log is updated. Then, the process is finished.

Figure 9:
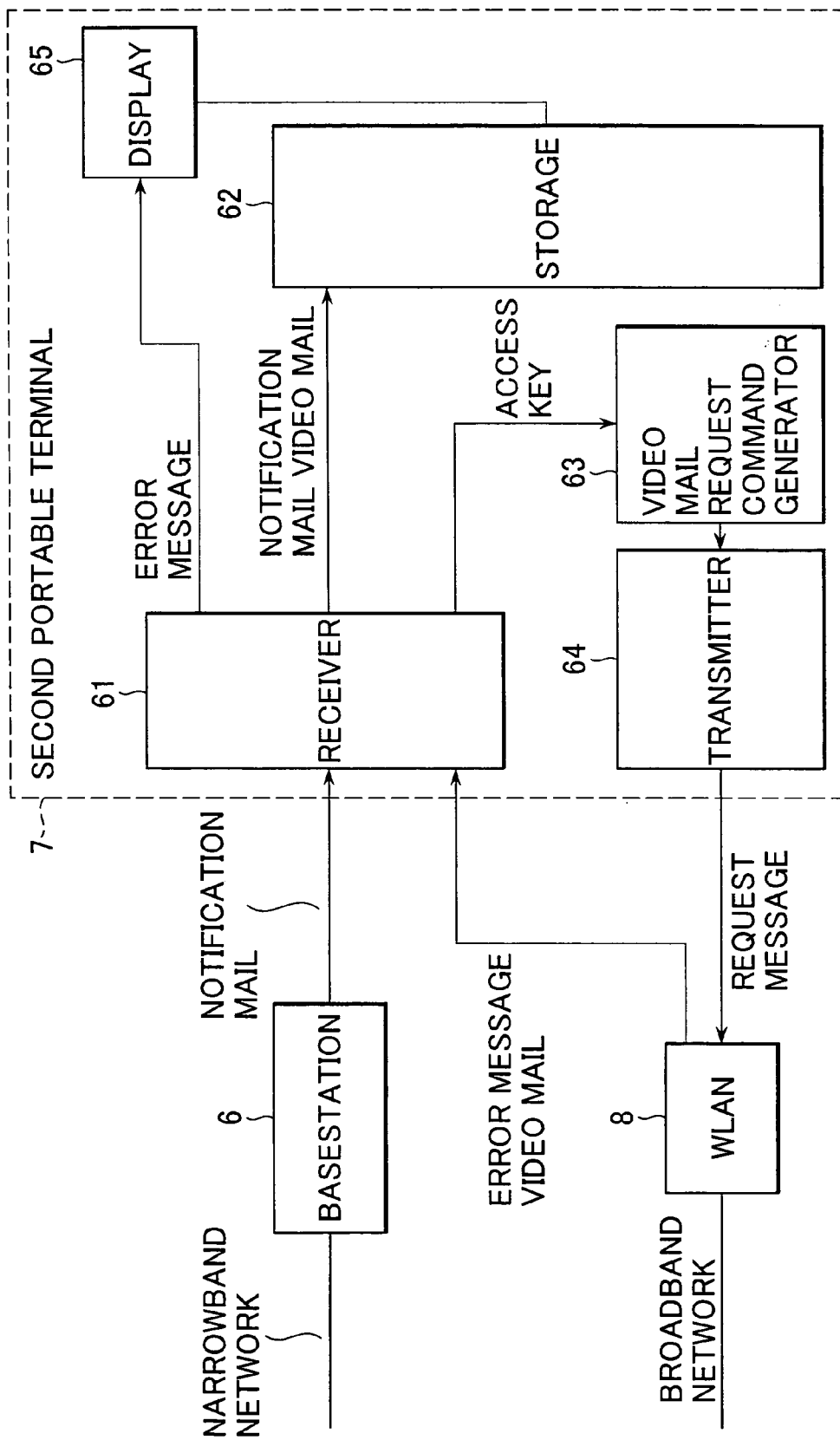
FIG. 9 is a block diagram illustrating the configuration of a second portable terminal 7.

FIG. 9 is a block diagram illustrating the configuration of the second portable terminal 7 shown in FIG. 1.

The second portable terminal 7 includes a receiver 61, a storage 62, a video mail request generator 63, a transmitter 64, and a display 65.

The receiver 61 receives data transmitted through a narrowband communication circuit (in this case, a portable telephone network) provided by the base station 6, and also receives data transmitted through a broadband communication circuit provided by the WLAN access point 8. In other words, the receiver 61 receives a notification mail, which is sent to the user of the second portable terminal 7 when the notification mail is transmitted from the base station 6. Moreover, the receiver 61 obtains an access key from the notification mail, and then outputs the access key to the video mail request command generator 63, and also outputs the notification mail to the storage 62.

When an error message is sent from the WLAN access point 8 to the receiver 61, the receiver 61 receives the error message and supplies the error message. When a video mail is sent from the LAN access point 8 to the receiver 61, the receiver 61 receives the video mail and supplies the video mail to the storage 62.

The storage 62 stores the notification mail and the video mail inputted from the receiver 61.

The video mail request command generator 63 receives an access key supplied from the receiver 61 and creates a request message having the access key and then outputs the request message to the transmitter 64.

The transmitter 64 transmits the request message, which is outputted from the video mail request command generator 63, to the file server 4 through the broadband communication circuit provided by the WLAN access point 8.

In response to an operation performed by a user, the display 65 indicates a video mail and a notification mail, which are stored in the storage 62. Also, the display 65 indicates an error message supplied from the receiver 61.

Figure 10:
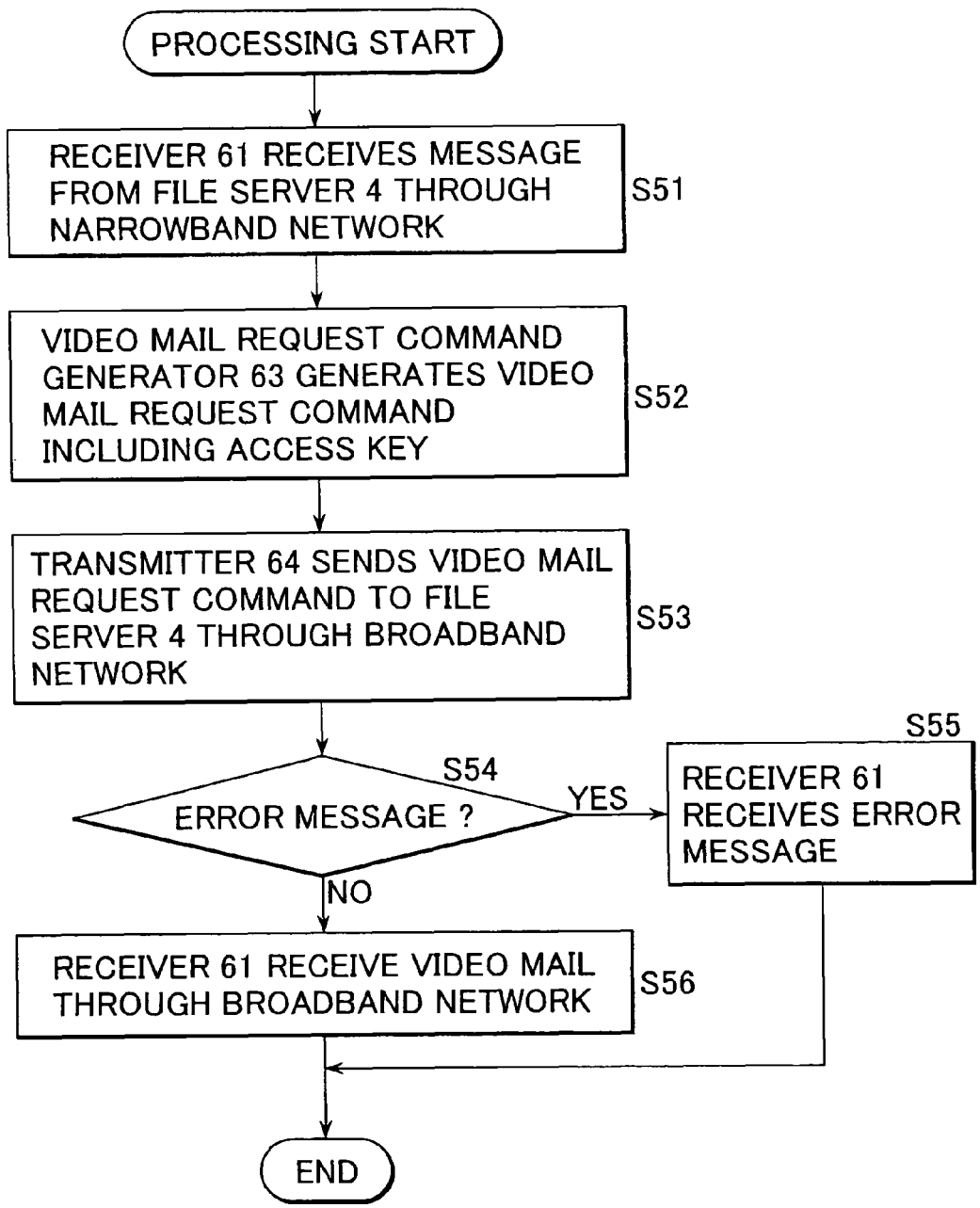
FIG. 10 is a flowchart illustrating an operation of the second portable terminal 7.

FIG. 10 is a flowchart illustrating an operation of the second portable terminal 7 shown in FIG. 9.

A process illustrated in FIG. 10 is commenced when a notification mail is transmitted from the file server 4 to the user of the second portable terminal 7 during the second portable terminal 7 is present in the cell of the WLAN access point 8.

In step S51, the receiver 61 receives a notification mail transmitted from the file server 4 through a narrowband communication circuit provided by the base station 6, and outputs the notification mail to the storage 62, which then stores the notification mail. Also, in step S51, the receiver 61 outputs an access key, which is included in the notification mail, to the video mail request command generator 63.

Thereafter, the user of the second portable terminal 7 operates the second portable terminal 7 to thereby cause the display 65 to indicate the notification mail stored in the storage 62. Thus, the user of the second portable terminal 7 notices the presence of the video mail destined for the user himself. Then, the user operates the second portable terminal 7 in such a way as to request the video mail. Then, the process proceeds to step S52 from step S51.

In step s52, the video mail request command generator 63 generates a request message, which includes the access key sent from the receiver 61, and then outputs the request message to the transmitter 64. The process then advances to step S53.

In step S53, the transmitter 64 transmits the request message, which is sent from the video mail request command generator 63, to the file server 4 through the broadband communication circuit provided by the WLAN access point 8.

In step S54, the receiver 61 judges whether or not an error message is transmitted from the file server 4. If the receiver 61 judges n step S54 that an error message is sent therefrom, in other words, in a case where an error message is transmitted thereto without permitting the user to access the video mail according to the access key included in the request message, which is transmitted to the file server in step S53, the process proceeds to step S55, whereupon the receiver 61 receives the error message and supplies the error message to the display 65 and causes the display 65 to indicate the error message. Thus, the process is finished.

Conversely, if the receiver 61 judges in step S54 that an error message is not transmitted from the file server 4, in other words, in a case that the user of the second portable terminal 7 is permitted according to the access key included in the request message, which is transmitted to the file server 4, to access the video mail, and that the video mail, which is sent to this user and identified according to the access key, is transmitted from the file server 4 through the broadband communication circuit provided by the WLAN access point 8, the process advances to step S56, whereupon the receiver 61 receives (or downloads) the video mail and outputs the video mail, which then stores the video mail. Subsequently, the process is finished. The video mail stored in the storage 62 can be supplied to and displayed by the display 65.

As above-mentioned, in the file server 4, a small capacity notification mail indicating the presence of a video mail, which is transmitted from the first portable terminal 1 to the user of the second portable terminal 7 and includes a large capacity motion picture file attached thereto, is transmitted to the second portable terminal 7 through the communication circuit that is provided by the base station 6 and that is a narrowband circuit and has a broad service area. Thus, the user of the second portable terminal 7 can instantaneously notice the presence of the video mail to be sent to this user. Also, the notification mail has a small capacity, so that the notification mail can be transmitted and received at low cost even in the case of using a narrowband communication circuit.

The second portable terminal 7 is adapted to request the file server 4 for a video mail by a request message having an access key included in a notification mail. The file server 4 transmits the video mail, which is identified according to the access key included in the request message and sent to the user of the second portable terminal 7, to the terminal 7 through the broad communication circuit that is provided by the WLAN access point 8 and that is a broadband circuit and has a narrow service area. Thus, the user of the second portable terminal 7 can receive a high quality video mail, the picture quality of which is comparable to that of a MPEG (Moving Picture Experts Group) video and that of a DV (Digital Video), at low cost.

In the file server 4, the format of (a motion picture file attached to) a video mail is converted to the format that is available at the second portable terminal 7, which is the destination of the video mail. Thus, the user of the first portable terminal 1 can send a video mail without caring about the format that is available by video playing software that the second portable terminal 7 has. In other words, the user of the first portable terminal 1 can send a video mail having a motion picture file of a given format. By the way, the format conversion includes an image size conversion, in addition to the conversion of a video format (for example, an MPEG format and an AVI format).

By the way, this embodiment employs the wireless communication circuit, which is provided by the WLAN access point 8, as a broadband communication circuit. Also, this embodiment employs the wireless communication circuit, which is provided by the base station 6, as a narrowband communication circuit. Additionally, wire communication circuits may be employed as the broadband or narrowband communication circuits.

Broadband wire communication circuits are, for example, ADSL and CATV networks, to which the PC 10 shown in FIG. 1 is connected. Narrowband wire communication circuits are, for instance, analog telephone circuits and an ISDN.

Although it is assumed in this embodiment that the first portable terminal 1 is the sender of the video mail, and that the second portable terminal 7 is the destination of the video mail, instead, for example, the PC 10 may be employed as the sender and the destination of the video mail.

Although this embodiment is adapted so that the second portable terminal 7 receives the notification mail and also receives the video mail according to the notification mail, the notification mail received by the second portable terminal 7 can be transferred to, for instance, the PC 10. Further, the PC 10 may receive the video mail according to the notification mail through the broadband communication circuit, such as ADSL.

Also, although this embodiment employs a motion picture file as large volume data, for instance, audio data and programs may be employed as large volume data, instead of the motion picture file.

Although the above-mentioned sequences of processes can be performed by hardware, the processes can be performed by software.

In the case of performing the sequences of processes by hardware, the file server 4 and the second portable terminal 7 can be implemented by the computer or the like, as illustrated in FIG. 11.

In the system shown in FIG. 11, aCPU (Central Processing Unit) 71 performs various kinds of processes according to programs stored in a ROM (Read-Only Memory) or programs loaded from a storage 78 to a RAM (Random Access Memory).

In the RAM 73, data, which is necessary for performing various processes by the CPU 71, is appropriately stored.

The CPU 71, the ROM 72, and the RAM 73 are connected to one another through a bus 74. Moreover, an input/output interface 75 is connected to this bus 74.

An input section 76 that includes a keyboard and a mouse, an output section 77 including a display, a storage 78 constituted by a hard disk or the like, and a communication section 79 are connected to the input/output interface 75.

If necessary, a drive 80 is connected to the input/output interface 75. A magnetic disk 81, an optical disk 82, a magneto-optical disk 83, or a semiconductor memory 84 may be mounted on the drive 80. Computer programs read therefrom are installed on the storage 78, as required.

In the case of performing the sequence of processes by software, programs of the software are installed from program storing media onto a computer incorporated into a dedicated hardware, or into a general-purpose computer that is enabled by installing various programs thereon to perform various functions.

As shown in FIG. 11, the program storing media for storing programs to be installed in a computer and to be brought by the computer into an executable state is constituted by package media that includes the magnetic disks 81 (including floppy disks), optical disks 82 (including a CD-ROM (Compact Disk Read Only Memory), a DVD (Digital Versatile Disk)), a magnet-optical disk 83 (including MD (mini-Disk) (a registered trademark)), or a semiconductor memory 78, or a ROM 72 for tentatively or permanently storing programs, and a hard disk constituting the storage 78. Programs may be stored in the program storing media by utilizing wire or wireless communication media, such as a local area network, the Internet, digital satellite broadcasting, through an interface, such as a router and a modem when necessary.

By the way, in the present specification, steps describing a program recorded in recording media include processes which are performed in a time-series manner along a described sequence and include processes performed in parallel or individually although the processes are not necessarily processed in a time-series manner.

By the way, in the present specification, the term "system" may designate an entire apparatus constituted by a plurality of devices.

It is therefore to be concluded that the present invention is not limited to the above-mentioned examples of preferred embodiments, so that examples of preferred embodiments of the present invention and equivalents thereof may be appropriately modified, combined, sub-combined, etc., to be implemented within the scope and the spirit of the invention.

What is claimed is:

1. An information processing system comprising:
an information processor configured to receive data transmitted from a transmitter and process the data, wherein said transmitter is a registered user of the information processor; and
a receiver configured to receive the data from said information processor, wherein said receiver is a registered user of the information processor;
said information processor comprises:
a data receptacle configured to receive said data from the transmitter, which includes large volume data that comprises data of large volume and destination information identifying a destination that the information processor will transmit the large volume data to, wherein the data receptacle is configured to store the large volume data received from the transmitter in a storage location for which only the receiver has access rights among registered users of the information processor;
a notification information transmitter configured to transmit notification information notifying presence of the large volume data, to said receiver, which is the destination of said large volume data corresponding to the destination information, via a base station in a narrowband communication network;
a key generator configured to generate a key that is sent to the receiver with the notification information and which is used to determine access to the large volume data stored in the storage location of the data receptacle the information processor, the key being generated after the information processor receives the large volume data from the transmitter; and
a large volume data transmitter configured to transmit said large volume data via an access point in a broadband communication network to said receiver in response from said receiver, and
said receiver comprises:
a notification information receptacle configured to receive said notification information with said key via said base station in the narrowband communication network;
a request unit configured to request said large volume data to said information processor via the access point, based on said notification information and using said key, when said receiver is within a communication range of the access point; and
a large volume data receptacle configured to receive said large volume data, which is sent from said information processor in response to said request for said large volume data, via said access point in the broadband communication network,
wherein the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

2. An information processor for receiving and processing data transmitted from a transmitter, comprising:
a data receptacle configured to receive the data from the transmitter, which includes large volume data that comprises data of large volume and destination information identifying a destination that the information processor will transmit the large volume data to, wherein said transmitter is a registered user of the information processor, wherein the data receptacle is configured to store the large volume data received from the transmitter in a storage location for which only a receiver corresponding to the destination has access rights among registered users of the information processor;
a notification information transmitter configured to transmit notification information notifying presence of the large volume data, to the receiver, which is the destination of said large volume data corresponding to the destination information, via a base station in a narrowband communication network, wherein said receiver is a registered user of the information processor;
a key generator configured to generate a key that is sent to the receiver with the notification information and which is used to determine access to the large volume data stored in the storage location of the data receptacle the information processor, the key being generated after the information processor receives the large volume data from the transmitter; and a large volume data transmitter configured to transmit said large volume data via an access point in a broadband communication network in response to a request from said receiver which includes said key and which is sent to the information processor via the access point when the receiver is within a communication range of the access point, wherein the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

3. The information processor according to claim 2, further comprising:

a format converter configured to convert a format of the large volume data to a format associated with said receiver; and said large volume data transmitter is configured to transmit said format-converted large volume data.

4. The information processor according to claim 2, wherein said narrowband communication network includes a portable telephone network, and wherein said broadband communication network includes a WLAN (Wireless Local Area Network).

5. The information processing system according to claim 1, the information processor further comprising:

a user information storage unit configured to store address information of users registered with the information processor, including the transmitter and the receiver; and an authenticator configured to determine whether a user is a registered with the information processor and to prevent large volume data from being transmitted to or from a user that is not a registered user.

6. An information processing method implemented on an information processor for receiving and processing data transmitted from a transmitter, comprising:

receiving, at data receptacle, the data at the information processor that is transmitted from said transmitter and includes large volume data, which comprises data of large volume and includes destination information identifying a destination that the information processor will transmit the large volume data to, wherein said transmitter is a registered user of the information processor, and storing the large volume data received from the transmitter in a storage location for which only a receiver corresponding to the destination has access rights among registered users of the information processor;

generating, at a key generator, a key that is sent to the receiver which is used to determine access to the large volume data stored in the storage location of the data receptacle the information processor, the key being generated after the information processor receives the large volume data from the transmitter;

transmitting, at the information processor, notification information notifying presence of said large volume data, to the receiver, which is the destination of the large volume data corresponding to the destination information, via a base station in a narrowband communication network, wherein said receiver is a registered user of the information processor, the notification information including the key generated at the key generator; and transmitting, at the information processor, said large volume data via an access point in a broadband communication network in response to a request from said receiver which includes said key and which is sent to the information processor via the access point when the receiver is within a communication range of the access point, wherein the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

7. A computer readable storage medium encoded with computer executable instructions, which when executed by a computer, causes the computer as an information processor to perform an information processing method of receiving and processing data transmitted from a transmitter, the method comprising:

receiving, at a data receptacle, the data transmitted from said transmitter and including large volume data comprising data of large volume and destination information identifying a destination that the information processor will transmit the large volume data to, wherein said transmitter is a registered user of the information processor, and storing the large volume data received from the transmitter in a storage location for which only a receiver corresponding to the destination has access rights among registered users of the information processor;

generating, at a key generator, a key that is sent to the receiver which is used to determine access to the large volume data stored in the storage location of the data receptacle the information processor, the key being generated after the information processor receives the large volume data from the transmitter;

transmitting notification information notifying presence of said large volume data, to the receiver, which is the destination of the large volume data corresponding to the destination information, via a base station in a narrowband communication network, wherein said receiver is a registered user of the information processor, the notification information including the key generated at the key generator; and transmitting said large volume data via an access point in a broadband communication network in response to a request from said receiver which includes said key and which is sent to the information processor via the access point when the receiver is within a communication range of the access point, wherein the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

8. A receiver for receiving data from an information processor receiving and processing data transmitted from a transmitter, comprising:

a notification information receptacle configured to receive from said information processor notification information notifying presence of large volume data comprising data of large volume, the large volume data is sent from said transmitter to said information processor and addressed to said receiver by the transmitter, said notification information received via a base station in a narrowband communication network, wherein said transmitter and receiver are registered users of the information processor, the notification information including a key that allows the receiver to access the large volume data stored in a storage location of the information processor for which only the receiver has access rights among registered users of the information processor, the key being generated after the information processor receives the large volume data from the transmitter;

request means for requesting said large volume data to said information processor, based on said information notification information and using said key, via an access point in a broadband communication network when the receiver is within a communication range of the access point; and large volume data receptacle for receiving said large volume data transmitted from said information processor via the access point in the broadband communication network, in response to said request from said request means, wherein the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

9. The receiver according to claim 8, wherein said narrowband communication network includes a portable telephone network, and wherein said broadband communication network includes a WLAN (Wireless Local Area Network).

10. A receiving method implemented on a receiver of receiving data from an information processor receiving and processing data transmitted from a transmitter, comprising:

receiving at the receiver from said information processor notification information notifying presence of large volume data comprising data of large volume and, the large volume data is sent from said transmitter to said information processor and addressed to said receiver by the transmitter, said notification information is received via a base station in a narrowband communication network, wherein said transmitter and receiver are registered users of the information processor, the notification information including a key that allows the receiver to access the large volume data stored in a storage location of the information processor for which only the receiver has access rights among registered users of the information processor, the key being generated after the information processor receives the large volume data from the transmitter;

requesting, at the receiver, said large volume data to said information processor, based on said information notification information and using said key, via an access point in a broadband communication network when the receiver is within a communication range of the access point; and receiving, at the receiver, said large volume data transmitted from said information processor via the access point in the broadband communication network, in response to said request from said requesting, wherein the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

11. A computer readable storage medium encoded with computer executable instructions, which when executed by a computer, causes the computer as a receiver to perform a receiving method of receiving data from an information processor, which receives and processes data transmitted from a transmitter, the method comprising:

receiving from said information processor notification information notifying presence of large volume data comprising data of large volume, the large volume data is sent from said transmitter to said information processor and addressed to said receiver by the transmitter, said notification information received via a base station in a narrowband communication network, said transmitter and receiver are registered users of the information processor, the notification information including a key that allows the receiver to access the large volume data stored in a storage location of the information processor for which only the receiver has access rights among registered users of the information processor, the key being generated after the information processor receives the large volume data from the transmitter;

requesting said large volume data to said information processor, based on said notification information and using said key, via an access point in a broadband communication network when the receiver is within a communication range of the access point; and receiving said large volume data transmitted from said information processor via the access point in the broadband communication network in response to said request from said requesting, wherein the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

12. An information processing system comprising:

an information processor configured to receive data transmitted from a transmitter and processing said data, wherein said transmitter is a registered user of the information processor; and a receiver configured to receive the data from said information processor, wherein said receiver is a registered user of the information processor, said information processor comprising:

a data receptacle configured to receive data from the transmitter including large volume data comprising data of large volume and destination information identifying a destination that the information processor will transmit the large volume data to, wherein the data receptacle is configured to store the large volume data received from the transmitter in a storage location for which only the receiver has access rights among registered users of the information processor;

a notification information transmitter configured to transmit notification information notifying presence of said large volume data to said receiver as the destination of said large volume data corresponding to the destination information, via a base station in a narrowband communication network;

a key generator configured to generate a key that is sent to the receiver with the notification information and which is used to determine access to the large volume data stored in the storage location of the data receptacle the information processor, the key being generated after the information processor receives the large volume data from the transmitter; and a large volume data transmitter configured to transmit said large volume data in response to a request from said receiver, via an access point in a broadband communication network to said receiver, said receiver comprises:

a notification information receptacle configured to receive said notification information, via said base station in the narrowband communication network;

request means for requesting said large volume data to said information processor, based on said notification information, via the access point when the receiver is within a communication range of the access point; and a large volume data receptacle configured to receive said large volume data sent from said information processor in response to said request for said large volume data, via said access point in the broadband communication network; and at least one of said narrowband communication network and said broadband communication network comprises a wireless circuit, wherein the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

13. An information processor for receiving and processing data transmitted from a transmitter, comprising:

a data receptacle configured to receive data transmitted from said transmitter and including large volume data comprising data of large volume and destination information identifying a destination that the information processor will transmit the large volume data to, wherein said transmitter is a registered user of the information processor, wherein the data receptacle is configured to store the large volume data received from the transmitter in a storage location for which only a receiver corresponding to the destination has access rights among registered users of the information processor;

a notification information transmitter configured to transmit notification information notifying presence of said large volume data, to the receiver as the destination of said large volume data corresponding to the destination information via a base station in a narrowband communication network, wherein said receiver is a registered user of the information processor;

a key generator configured to generate a key that is sent to the receiver with the notification information and which is used to determine access to the large volume data stored in the storage location of the data receptacle the information processor, the key being generated after the information processor receives the large volume data from the transmitter; and a large volume data transmitter configured to transmit said large volume data via an access point in a broadband communication network in response to a request from said receiver which is sent to the information processor when the receiver is within a communication range of the access point; wherein at least one of said narrowband communication network and said broadband communication network comprises a wireless circuit, wherein the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

14. The information processor according to claim 13, further comprising:

a format converter configured to convert a format of said large volume data to a format associated with said receiver, wherein said large volume data transmitter is configured to transmit said format-converted large volume data.

15. The information processor according to claim 13, wherein said narrowband communication network includes a portable telephone network, and said broadband communication network includes a WLAN (Wireless Local Area Network).

16. An information processing method implemented at an information processor for receiving and processing data transmitted from a transmitter, comprising:

receiving, at data receptacle, data at the information processor that is transmitted from said transmitter and including large volume data comprising data of large volume and destination information identifying a destination that the information processor will transmit the large volume data to, wherein said transmitter is a registered user of the information processor, and storing at the data receptacle the large volume data received from the transmitter in a storage location for which only a receiver corresponding to the destination has access rights among registered users of the information processor;

generating, at a key generator, a key that is sent to the receiver and which is used to determine access to the large volume data stored in the storage location of the data receptacle the information processor, the key being generated after the information processor receives the large volume data from the transmitter;

transmitting, at the information processor, notification information notifying presence of said large volume data, to the receiver as the destination of the large volume data corresponding to the destination information via a base station in a narrowband communication network, wherein said receiver is a registered user of the information processor, the notification information including the key generated at the key generator; and transmitting, at the information processor, said large volume data to said receiver, via an access point in a broadband communication network, in response to a request from said receiver which is sent to the information processor when the receiver is within a communication range of the access point; wherein at least one of said narrowband communication network and said broadband communication network comprises a wireless circuit, and the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

17. A computer readable storage medium encoded with computer executable instructions, which when executed by a computer, causes the computer as an information processor to perform an information processing method of receiving and processing data transmitted from a transmitter, the method comprising:

receiving, at a data receptacle, data transmitted from said transmitter and including large volume data comprising data of large volume and destination information identifying a destination that the information processor will transmit the large volume data to, wherein said transmitter is a registered user of the information processor, and storing at the data receptacle the large volume data received from the transmitter in a storage location for which only a receiver corresponding to the destination has access rights among registered users of the information processor;

generating, at a key generator, a key that is sent to the receiver and which is used to determine access to the large volume data stored in the storage location of the data receptacle the information processor, the key being generated after the information processor receives the large volume data from the transmitter;

transmitting notification information notifying presence of said large volume data, to the receiver as the destination of the large volume data corresponding to the destination information via a base station in a narrowband communication network, wherein said receiver is a registered user of the information processor, the notification information including the key generated at the key generator; and transmitting said large volume data to said receiver, via an access point in a broadband communication network, in response to a request from said receiver which is sent to the information processor when the receiver is within a communication range of the access point; wherein at least one of said narrowband communication network and said broadband communication network comprises a wireless circuit, and the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

18. A receiver for receiving data from an information processor receiving and processing data transmitted from a transmitter, comprising:

a notification information receptacle configured to receive from said information processor notification information notifying presence of large volume data comprising data of large volume, the large volume data is sent from said transmitter to said information processor and addressed to said receiver by the transmitter, said notification information received via a base station in a narrowband communication network, wherein said transmitter and receiver are registered users of the information processor, the notification information including a key that allows the receiver to access the large volume data stored in a storage location of the information processor for which only the receiver has access rights among registered users of the information processor, the key being generated after the information processor receives the large volume data from the transmitter;

request means for requesting said large volume data to said information processor, based on said notification information and using said key, via an access point in a broadband communication network when the receiver is within a communication range of the access point; and a data receptacle configured to receive said large volume data, transmitted from said information processor in response to said request for said large volume data, via the access point in the broadband communication network; wherein at least one of said narrowband communication network and said broadband communication network comprises a wireless circuit, and the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

19. The receiver according to claim 18, wherein said narrowband communication network includes a portable telephone network, and said broadband communication network includes a WLAN (Wireless Local Area Network).

20. A receiving method implemented on a receiver of receiving data from an information processor receiving and processing data transmitted from a transmitter, comprising:

receiving at the receiver from said information processor notification information notifying presence of large volume data comprising data of large volume, the large volume data is sent from said transmitter to said information processor and addressed to said receiver by the transmitter, said notification information received via a base station in a narrowband communication network, wherein said transmitter and receiver are registered users of the information processor, the notification information including a key that allows the receiver to access the large volume data stored in a storage location of the information processor for which only the receiver has access rights among registered users of the information processor, the key being generated after the information processor receives the large volume data from the transmitter;

requesting, at the receiver, said large volume data to said information processor, based on said notification information and using said key, via an access point in a broadband communication network when the receiver is within a communication range of the access point; and receiving, at the receiver, said large volume data, transmitted from said information processor in response to said request for said large volume data, via the access point in the broadband communication network; wherein at least one of said narrowband communication network and said broadband communication network comprises a wireless circuit, and the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

21. A computer readable storage medium encoded with computer executable instructions, which when executed by a computer, causes the computer as a receiver to perform a receiving method of receiving data from an information processor receiving and processing data transmitted from a transmitter, the method comprising:

receiving from said information processor notification information notifying presence of large volume data comprising data of large volume, the large volume data is sent from said transmitter to said information processor and addressed to said receiver by the transmitter, said notification information received via a base station in a narrowband communication network, wherein said transmitter and receiver are registered users of the information processor, the notification information including a key that allows the receiver to access the large volume data stored in a storage location of the information processor for which only the receiver has access rights among registered users of the information processor, the key being generated after the information processor receives the large volume data from the transmitter;

requesting said large volume data to said information processor, based on said notification information and using said key, via an access point in a broadband communication network when the receiver is within a communication range of the access point; and receiving said large volume data, transmitted from said information processor in response to said request for said large volume data, via the access point in the broadband communication network; wherein at least one of said narrowband communication network and said broadband communication network comprises a wireless circuit, and the receiver is configured to receive said notification information via said base station when the receiver is not in a communication range of the access point and the receiver does not receive said large volume data when the receiver is not in a communication range of the access point, and the receiver is configured to request said large volume data to said information processor via the access point when the receiver moves into the communication range of the access point after the receiver has received said notification information via the base station.

* * * * *